United States Patent
Rawat et al.

(10) Patent No.: US 7,558,253 B1
(45) Date of Patent: *Jul. 7, 2009

(54) METHOD AND SYSTEM FOR DISRUPTING UNDESIRABLE WIRELESS COMMUNICATION OF DEVICES IN COMPUTER NETWORKS

(75) Inventors: Jai Rawat, Sunnyvale, CA (US); Krishnamurthy Nagabhushan Gopinath, Bangalore, IN (US); Pankaj Chauhan, Pune (IN)

(73) Assignee: AirTight Networks, Inc., Mountain View, CA (US)

( * ) Notice: Subject to any disclaimer, the term of this patent is extended or adjusted under 35 U.S.C. 154(b) by 14 days.

This patent is subject to a terminal disclaimer.

(21) Appl. No.: 11/934,094

(22) Filed: Nov. 2, 2007

Related U.S. Application Data

(63) Continuation of application No. 11/330,948, filed on Jan. 11, 2006, now Pat. No. 7,333,481.

(60) Provisional application No. 60/725,250, filed on Oct. 11, 2005.

(51) Int. Cl.
*H04L 12/66* (2006.01)
*H04L 9/32* (2006.01)
*H04B 7/00* (2006.01)

(52) U.S. Cl. ............................. 370/352; 370/389; 726/4
(58) Field of Classification Search .................... None
See application file for complete search history.

(56) References Cited

U.S. PATENT DOCUMENTS

| | | | |
|---|---|---|---|
| 7,333,481 B1 * | 2/2008 | Rawat et al. | 370/352 |
| 2003/0219008 A1 * | 11/2003 | Hrastar | 370/352 |
| 2005/0050365 A1 * | 3/2005 | Seki et al. | 713/201 |

* cited by examiner

*Primary Examiner*—Ricky Ngo
*Assistant Examiner*—Clemence Han
(74) *Attorney, Agent, or Firm*—AIRTIGHT NETWORKS; Hemant M. Chaskar

(57) ABSTRACT

A method for disrupting unauthorized communications between at least two communication devices is provided. The method comprises using an address resolution protocol (ARP) to redirect transfer of data that occurs using unauthorized wireless communication between a first wireless device and a second wireless device. In a preferred embodiment, the method maintains a layer two wireless link while the data are being redirected.

20 Claims, 13 Drawing Sheets

METHOD AND SYSTEM FOR DISRUPTING UNDESIRABLE WIRELESS COMMUNICATION OF DEVICES IN COMPUTER NETWORKS

CROSS-REFERENCES TO RELATED APPLICATIONS

This present application is a continuation application of U.S. application Ser. No. 11/330,948 filed on Jan. 11, 2006 entitled "METHOD AND SYSTEM FOR DISRUPTING UNDESIRABLE WIRELESS COMMUNICATION OF DEVICES IN COMPUTER NETWORKS", commonly assigned, and hereby incorporated by reference herein, which claims priority to U.S. Provisional Application No. 60/725,250 filed Oct. 11, 2005, entitled METHOD AND SYSTEM FOR DISRUPTING UNDESIRABLE WIRELESS COMMUNICATION OF DEVICES IN COMPUTER NETWORKS, commonly assigned and hereby incorporated by reference for all purposes.

BACKGROUND OF THE INVENTION

The present invention relates generally to wireless computer networking techniques. More particularly, the invention provides methods and systems for disrupting undesirable wireless communication of devices in local area networks. These methods and systems can be applied to many computer networking environments, e.g., environments based upon the IEEE 802.11 family of standards (WiFi), Ultra Wide Band (UWB), IEEE 802.16 (WiMAX), Bluetooth, and others.

Computer systems have proliferated from academic and specialized science applications to day-to-day business, commerce, information distribution and home applications. Such systems can include personal computers (PCs) to large mainframe and server class computers. Powerful mainframe and server class computers run specialized applications for banks, small and large companies, e-commerce vendors, and governments. Personal computers can be found in many offices, homes, and even local coffee shops.

The computer systems located within a specific local geographic region (e.g. an office, building floor, building, home, or any other defined indoor and/or outdoor geographic region) are typically interconnected using a Local Area Network (LAN) (e.g. the Ethernet). The LANs, in turn, can be interconnected with each other using a Wide Area Network (WAN) (e.g. the Internet). A conventional LAN can be deployed using an Ethernet-based infrastructure comprising cables, hubs switches, and other elements.

Connection ports (e.g. Ethernet ports) can be used to couple multiple computer systems to the LAN. For example, a user can connect to the LAN by physically attaching a computing device (e.g. a laptop, desktop, or handheld computer) to one of the connection ports using physical wires or cables. Other types of computer systems, such as database computers, server computers, routers, and Internet gateways, can be connected to the LAN in a similar manner. Once physically connected to the LAN, a variety of services can be accessed (e.g. file transfer, remote login, email, WWW, database access, and voice over IP).

Using recent (and increasingly popular) wireless technologies, users can now be wirelessly connected to the computer network. Thus, wireless communication can provide wireless access to a LAN in the office, home, public hot-spot, and other geographical locations. As an example, the IEEE 802.11 family of standards (also called Wireless Local Area Network, WLAN or WiFi) is a common standard for such wireless communication. In WiFi, the 802.11b standard provides for wireless connectivity at speeds up to 11 Mbps in the 2.4 GHz radio frequency spectrum The 802.11g standard provides for even faster connectivity at about 54 Mbps in the 2.4 GHz radio frequency spectrum; and the 802.11a standard provides for wireless connectivity at speeds up to 54 Mbps in the 5 GHz radio frequency spectrum. Wireless communication standards that offer even higher data rates and/or operate in different frequency spectrums are also being proposed.

Advantageously, WiFi can facilitate a quick and effective way of providing a wireless extension to an existing LAN. To provide this wireless extension, one or more WiFi access points (APs) can connect to the connection ports either directly or through intermediate equipment, such as WiFi switch. After an AP is connected to a connection port, a user can access the LAN using a device (called a station) equipped with WiFi radio. The station can wirelessly communicate with the AP. Wireless networks have been highly successful.

Wireless networks use radio signals for information transfer. Since wireless signals cannot be confined to physical boundaries of premises, they often cause a variety of security concerns. For example, unauthorized wireless device (e.g. in neighboring premises, parking lot, street) can use ad hoc wireless communication to communicate with authorized wireless device in the LAN and access confidential information on the authorized device. Moreover, the unauthorized device can gain access into the authorized device and exploit the authorized device as a launching pad for attacks on the LAN. Another example of security concern is the possibility of wireless devices in the LAN connecting (e.g. unwittingly or maliciously) to external APs (e.g. APs in the neighboring premises, malicious APs in the neighborhood, honeypot APs etc.). Unauthorized wireless devices can also wirelessly connect to authorized APs in the LAN. Therefore, a need arises for improving the security for wireless LAN environments.

BRIEF SUMMARY OF THE INVENTION

According to the present invention, techniques related to wireless computer networking are provided. More particularly, the invention provides methods and systems for disrupting undesirable wireless communication of devices in local area networks. In a specific embodiment, the undesirable wireless communication occurs using peer to peer (ad hoc) type wireless communication protocol, but there can also be others. These methods and systems can be applied to many computer networking environments, e.g., environments based upon the IEEE 802.11 family of standards (WiFi), Ultra Wide Band (UWB), IEEE 802.16 (WiMAX), Bluetooth, and others.

Application of wireless communication to computer networking has introduced significant security risks, for example, due to radio signal spillage. For example, unauthorized wireless device (e.g. in neighboring premises, parking lot, street) can use ad hoc wireless communication to communicate with authorized wireless device and access confidential information on the authorized device. Moreover, the unauthorized device can gain access into the authorized device and exploit the authorized device as a launching pad for attacks on the LAN. Another example of security concern is the possibility of wireless devices in the LAN connecting (e.g. unwittingly or maliciously) to external APs (e.g. APs in the neighboring premises, malicious APs in the neighborhood etc.). Unauthorized wireless devices can also wirelessly connect to authorized APs in the LAN.

The present invention provides methods and systems for wireless computer networking which can disrupt undesirable wireless communication of devices in the LAN environments. For example, the technique of present invention can advantageously provide for disrupting undesirable ad hoc wireless communication, undesirable communication of authorized clients with external APs, undesirable wireless communication of unauthorized clients with authorized APs and so on.

According to an aspect of the present invention, a method for disrupting undesirable communications between at least two communication devices is provided. The method comprises providing a plurality of wireless devices within and/or in a vicinity of a selected local geographic region. As merely an example, the selected geographic region can comprise office space, commercial facility, campus, apartment etc. The plurality of wireless devices can include laptop computers, PDAs, mobile phones, access points and so on. The method comprises providing one or more sniffer devices within and/or in a vicinity of the selected geographic region. Preferably the sniffer devices are spatially disposed to monitor wireless activity within at least a subset of the selected local geographic region.

The method includes detecting wireless signals transmitted by the plurality of wireless devices using one or more of the sniffer devices. Moreover the method includes processing one or more of the wireless signals to determine an occurrence of data transfer using undesirable wireless communication between a first wireless device and a second wireless device. Preferably the first and the second wireless devices are from the plurality of wireless devices.

The method comprises transferring a message from one or more of the sniffer devices to the first wireless device to disrupt the data transfer. It includes receiving the message from the one or more sniffer devices at the first wireless device and processing the message at the first wireless device. The method includes causing a change to one or more entries in one or more memories associated with the first wireless device, the one or more entries being indicated with the second wireless device. For example the one or more entries indicated with the second device can include ARP (Address Resolution Protocol) entry associated with the second device. Alternatively, the ARP entry can be associated with a computer system coupled to the second device. Moreover the method includes redirecting the data transfer to cause disruption to the data transfer.

According to another aspect of the present invention, a method for disrupting unauthorized communications between at least two communication devices is provided. The method comprises using an address resolution protocol (ARP) to redirect data transfer using unauthorized wireless communication between a first wireless device and a second wireless device. In a preferred embodiment, the method maintains a layer 2 wireless communication connection while the data are being redirected.

According to yet another aspect of the present invention, an apparatus for detecting wireless transmissions from one or more wireless devices is provided. The apparatus comprises a processing module. The processing module can include a micro processing device coupled to one or more memory devices. Moreover, the apparatus comprises a detection module coupled to the processing module. The detection module is adapted to identify undesirable wireless communication between at least two wireless devices from a plurality of wireless devices. The apparatus comprises a receiver module coupled to the processing module. The receiver module is adapted to receive information associated with the undesirable wireless communication between the two wireless devices. In an embodiment the information can include at least a MAC address and an IP address of a communication device. Preferably the communication device uses the undesirable wireless communication for data transfer. The apparatus also comprises a redirection module coupled to the receiver module. The redirection module is adapted to transfer one or more messages to at least one of the two wireless devices to cause a change to one or more entries in one or more memories coupled to the at least one wireless device. Preferably the change causes redirection of the data transfer. Preferably the redirection causes disruption to the data transfer. In an embodiment the one or more entries comprise entries indicated to the MAC address and the IP address of the communication device.

In accordance with yet a further aspect of the present invention a method for disrupting unauthorized communications between at least two communication devices comprises detecting a transfer of data over a wireless link between a first wireless device and a second wireless device. In a preferred embodiment, the wireless link uses a wireless MAC protocol. In an embodiment, the wireless MAC protocol is an IEEE 802.11 wireless MAC protocol. In an embodiment, the wireless link is an ad hoc wireless link. In an alternative embodiment, the wireless link is an infrastructure mode wireless link. Preferably the wireless link is undesirable. The method comprises transferring data over the wireless link. Moreover, the method comprises disrupting (e.g., halting, redirecting, resetting, corrupting) the transfer of data while maintaining the wireless link between the first and the second wireless device by transferring one or more wireless signals from a third wireless device. In an embodiment, the wireless signals comprises at least one of an ARP message, a TCP (transmission control protocol) reset message, a random data message, or an erroneous data message.

In an alternative embodiment a system for disrupting unauthorized communications between at least two communication devices is provided. The system includes a detection module adapted to identify an occurrence of data transfer using undesirable wireless link between a first and a second wireless device. For example the wireless link is provided using an IEEE 802.11 wireless MAC protocol. Moreover the system includes a prevention module adapted to disrupt the data transfer while maintaining the wireless link between the first and the second wireless device.

Certain advantages and/or benefits may be achieved using the present invention. For example, the present technique provides an easy to use process and system that rely upon conventional computer hardware and software technologies. In some embodiments, the method and system can disrupt undesirable (or unauthorized) wireless communication. This can advantageously protect local area networks from wireless security breaches. Moreover the method and system can prevent channel hopping and/or access point hopping of devices while disrupting undesirable wireless communication between them. The method and system can cause substantial disruption to undesirable wireless communication with low wireless bandwidth overhead. Depending upon the embodiment, one or more of these benefits may be achieved. These and other benefits will be described in more throughout the present specification and more particularly below.

DETAILED DESCRIPTION OF THE INVENTION

According to the present invention, techniques related to wireless computer networking are provided. More particularly, the invention provides methods and systems for disrupting undesirable wireless communication of devices in local area networks. In a specific embodiment, the undesirable wireless communication occurs using peer to peer type communication protocol, but there can also be others. These methods and systems can be applied to many computer networking environments, e.g. environments based upon the IEEE 802.11 family of standards (WiFi), Ultra Wide Band (UWB), IEEE 802.16 (WiMAX), Bluetooth, and others.

Application of wireless communication to computer networking has introduced significant security risks. Wireless networks use radio signals for information transfer. Since wireless signals cannot be confined to physical boundaries of premises, they often cause a variety of security concerns. For example, the IEEE 802.11 MAC standard provides for two modes of network operation, namely infrastructure mode and ad hoc mode. In the infrastructure mode operation, wireless devices communicate with APs over wireless link. The APs are preferably coupled to the wired LAN infrastructure. In the ad hoc mode (also known as Independent Basic Service Set (IBSS) mode or peer-to-peer mode), the wireless devices (such as laptops) can directly communicate with each other over wireless link. The ad hoc wireless communication is undesirable from the security standpoint. For example, unauthorized wireless device (e.g. in neighboring premises, parking lot, street) can use ad hoc wireless communication to communicate with authorized wireless device and access confidential information on the authorized device. Moreover, the unauthorized device can gain access into the authorized device and exploit the authorized device as a launching pad for attacks on the LAN.

Another example of security concern is certain infrastructure mode wireless connections such as wireless devices in the LAN connecting (e.g. unwittingly or maliciously) to external APs (e.g. APs in the neighboring premises, malicious APs in the neighborhood, honeypot APs provided by attacker etc.).

Yet another example of infrastructure mode wireless connections that pose security threats is that of unauthorized wireless devices (e.g. devices outside the office premises) connecting over wireless link to authorized APs in the LAN. For example, authorized AP can be misconfigured and allow such devices to connect to it. The unauthorized devices can inflict variety of attacks on the LAN (e.g. even the wired portion of the LAN) over such connections.

Accordingly, the present invention provides methods and systems for disrupting undesirable wireless communication of devices in the LAN environments. Advantageously, these methods and systems can prevent network and/or information security breaches over such undesirable wireless connections.

Figure 1:
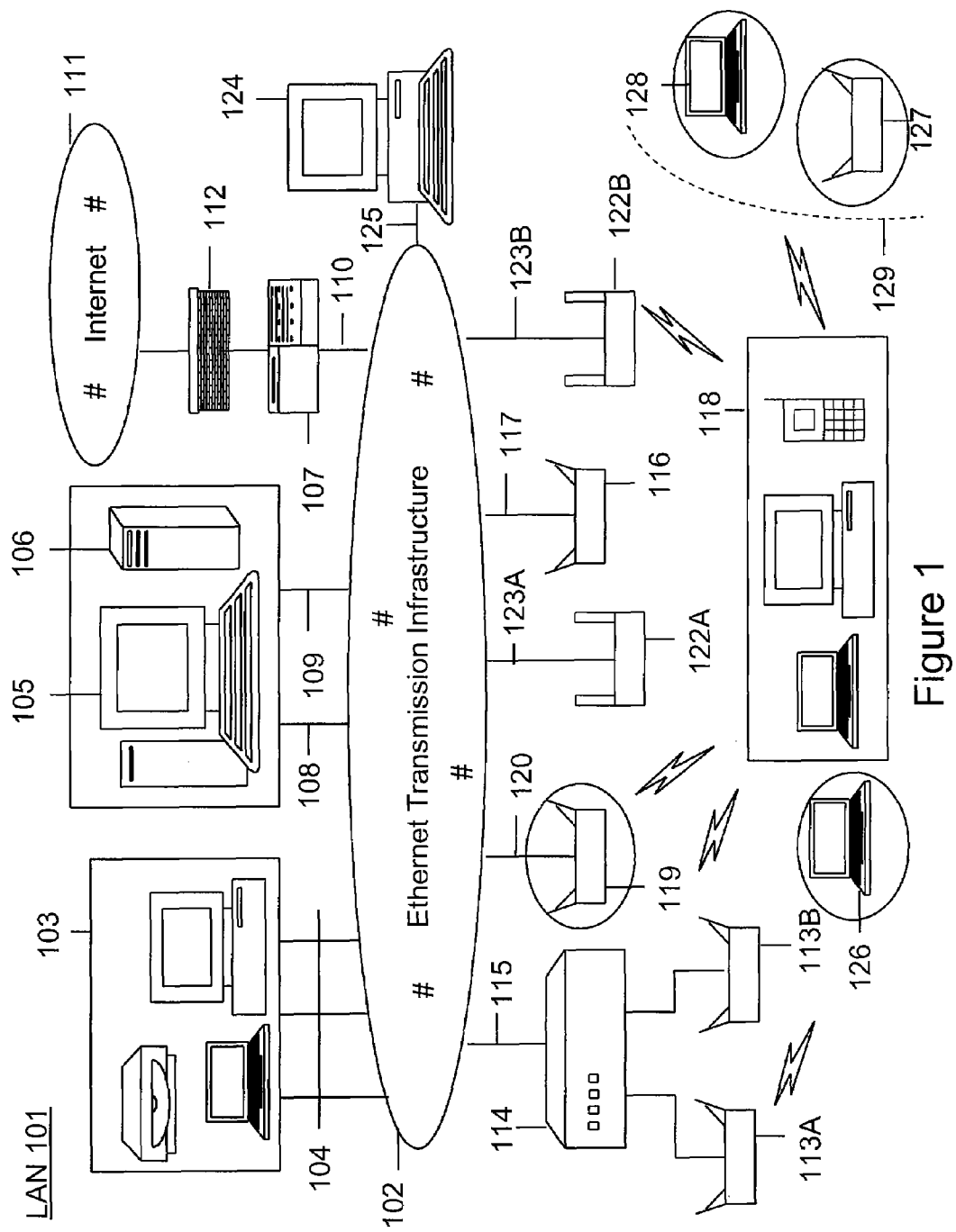
FIG. 1 illustrates a simplified LAN architecture that can facilitate disrupting undesirable wireless communication according to an embodiment of the present invention.

FIG. 1 illustrates a simplified local area network (LAN) 101 that can facilitate disrupting undesirable wireless connections according to an embodiment of the present invention. This diagram is merely an example, which should not unduly limit the scope of the claims. One of ordinary skill in the art would recognize many variations, modifications, and alternatives. In LAN 101, a core transmission infrastructure 102 can include various transmission components, e.g. Ethernet cables, hubs, and switches. In a typical deployment, the core transmission infrastructure 102 comprises one or more network segments.

According to an embodiment, a network segment refers to an IP "subnetwork" (called "subnet"). Each subnet is identified by a network number (e.g. IP number and subnet mask) and plurality of subnets are interconnected using router devices. Notably, the plurality of subnets of the LAN 101 can be geographically distributed (e.g. in offices of a company in different geographic locations). The geographically distributed segments are interconnected via virtual private network (VPN).

One or more connection ports (e.g. Ethernet sockets) are provided on each of the segments for connecting various computer systems to the LAN 101. Thus, one or more end user devices 103 (such as desktop computers, notebook computers, telemetry sensors etc.) can be connected to LAN 101 via one or more connection ports 104 using wires (e.g. Ethernet cables) or other suitable connection means.

Other computer systems that provide specific functionalities and services can also be connected to LAN 101. For example, one or more database computers 105 (e.g. computers storing customer accounts, inventory, employee accounts, financial information, etc.) may be connected to LAN 101 via one or more connection ports 108. Additionally, one or more server computers 106 (computers providing services, such as database access, email storage, HTTP proxy service, DHCP service, SIP service, authentication, network management etc.) may be connected to LAN 101 via one or more connection ports 109.

In this embodiment, a router 107 can be connected to LAN 101 via a connection port 110. Router 107 can act as a gateway between LAN 101 and the Internet 111. Note that a firewall/VPN gateway 112 can be used to connect router 107 to the Internet 111, thereby protecting computer systems in LAN 101 against hacking attacks from the Internet 111 as well as enabling remote secure access to LAN 101.

In this embodiment, a wireless extension of LAN 101 is also provided. For example, authorized APs 113A and 113B can be connected to LAN 101 via a switch 114. Switch 114 in turn can be connected to a connection port 115. Switch 114 can assist APs 113A and 113B in performing certain complex procedures (e.g. procedures for authentication, encryption, QoS, mobility, firewall etc.) as well as provide centralized management functionality for APs 113A and 113B. Note that an authorized AP 116 can also be directly connected to LAN 101 via a connection port 117. In this case, AP 116 may perform necessary security procedures (such as authentication, encryption, firewall, etc.) itself.

In this configuration, one or more end user devices 118 (such as desktop computers, laptop computers, handheld computers, PDAs, etc.) equipped with radio communication capability can wirelessly connect to LAN 101 via authorized APs 113A, 113B, and 116. Notably, authorized APs connected to the LAN 101 provide wireless connection points on the LAN. Note that WiFi or another type of wireless network format (e.g. UWB, WiMax, Bluetooth, etc.) can be used to provide the wireless protocols.

As shown in FIG. 1, an unauthorized wireless device 126 or 128 can use ad hoc wireless communication to communicate with one of the authorized devices 118. The station 126 can compromise the integrity of the authorized device and can even gain unauthorized access to the LAN 101 through the authorized device (e.g. if the authorized device is connected to the LAN over wired connection port or wireless connection port). Notably the security threat from ad hoc wireless communication exists even when the LAN 101 does not use wireless extensions. Mere presence of devices that are WiFi capable (e.g. laptops, PDAs, mobile phones etc.) can cerate ad hoc communication vulnerability. Moreover, such a threat can occur from an unauthorized wireless device 128 that is outside the perimeter 129 of the LAN environment (e.g. from a neighbor's building, street, parking lot etc.).

As shown in FIG. 1, an authorized wireless device 118 can engage in an undesirable communication with an external AP 127. As merely an example, external AP can be neighbor's AP, honeypot AP or any other AP that is not a part of LAN 101. This can compromise the security of the whole network as the authorized device can reveal secrets such as passwords to the external AP. External AP can also include itself as man in the middle of authorized communication.

As shown in FIG. 1, an unauthorized wireless device 126 or 128 can engage in an undesirable communication with an authorized AP 113A, 113B, 116 etc. This can happen if the AP is mis-configured (e.g., open AP). In an alternative embodiment, an unauthorized wireless device can connect to unauthorized AP (e.g. Rogue AP) 119 that can be connected to the LAN 101 e.g. without the knowledge of the system administrator. This can compromise the security of the whole network as the unauthorized device can access the resources in the LAN environment. As merely an example an unauthorized wireless device 128 can be a wireless device in neighboring premises, street, parking lot or any other device that is not authorized to access the resources on LAN 101.

In accordance with one aspect of the invention, a security monitoring system can detect and disrupt undesirable wireless communication of devices associated with the LAN 101. The security monitoring system can include one or more RF sensor devices (e.g. sensor devices 122A and 122B, each generically referenced herein as a sniffer 122) disposed within and/or in a vicinity of a geographic region comprising LAN 101. In an embodiment (shown in FIG. 1), sniffer 122 can be connected to LAN 101 via a connection port (e.g. connection port 123A/123B). In another embodiment, sniffer 122 can be connected to LAN 101 using a wireless connection.

In an embodiment, a sniffer 122 is able to monitor wireless activity in a subset of the geographic region comprising LAN 101. Wireless activity can include any transmission of control, management, or data packets between an AP and one or more wireless stations, or among one or more wireless stations.

In general, sniffer 122 can listen to a radio channel and capture transmissions on that channel. In an embodiment, sniffer 122 can cycle through multiple radio channels on which wireless communication could take place. On each radio channel, sniffer 122 can wait and listen for any ongoing transmission. In an embodiment, sniffer 122 can operate on multiple radio channels simultaneously.

Whenever a transmission is detected, sniffer 122 can collect and record the relevant information about that transmission. This information can include all or a subset of information gathered from various fields in a captured packet. In another embodiment, a receive signal strength indicator (RSSI) associated with the captured packet can also be recorded. Other information such as the day and the time the transmission was detected can also be recorded. The information collected by one or more sniffers can be used to detect undesirable wireless communication.

A sniffer 122 can transmit packets over the wireless medium. These packet transmissions can facilitate disrupting of the detected undesirable wireless communication according to an aspect of the present invention.

Figure 2:
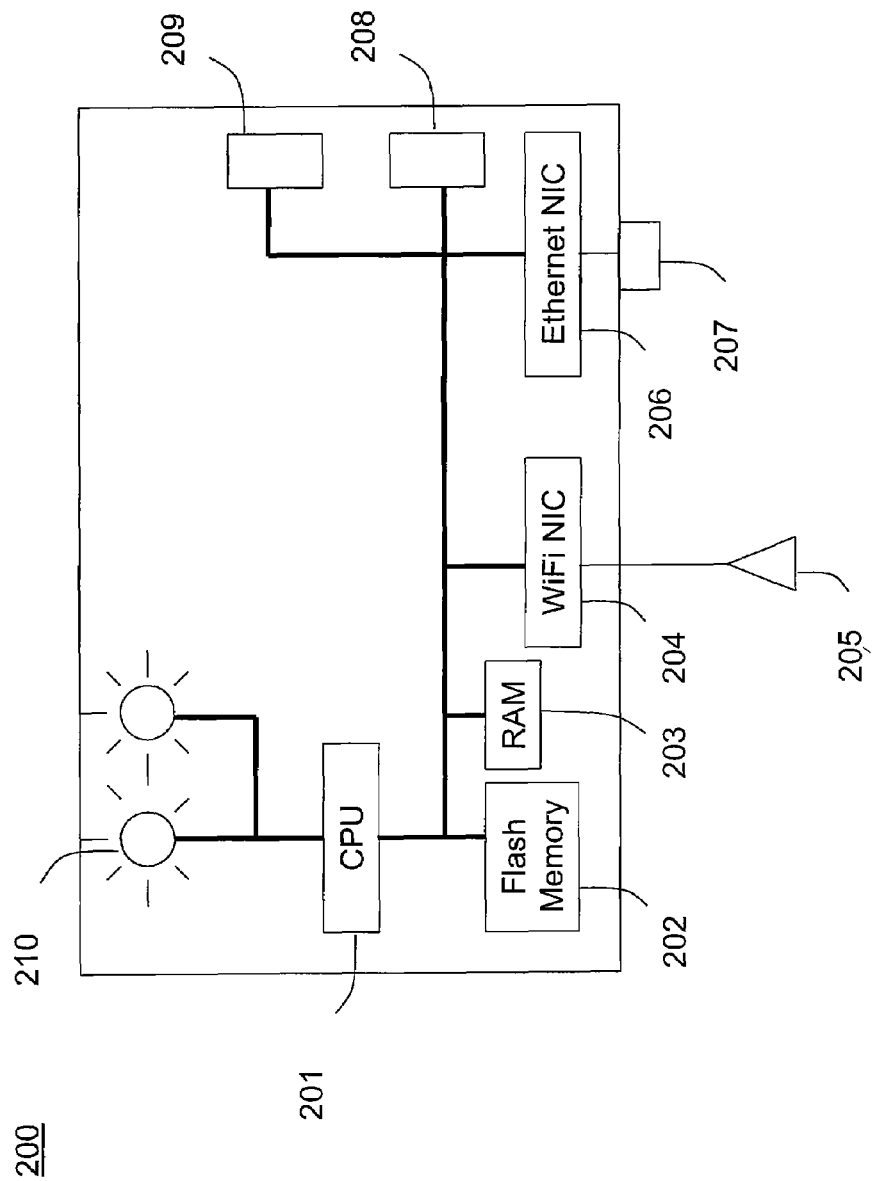
FIG. 2 illustrates simplified exemplary sniffer device architecture according to an embodiment of the present invention.

An exemplary hardware diagram of the sniffer is shown in FIG. 2. This diagram is merely an example, which should not unduly limit the scope of the claims. One of ordinary skill in the art would recognize many variations, alternatives, and modifications. As shown, sniffer 122 can have a central processing unit (CPU) 201, a flash memory 202 where the software code for sniffer functionality resides, and a RAM 203 which serves as volatile memory during program execution. The sniffer 122 can have one or more 802.11 wireless network interface cards (NICs) 204 which perform radio and wireless MAC layer functionality and one or more of dual-band (i.e., for transmission detection in both the 2.4 GHz and 5 GHz radio frequency spectrums) antennas 205 coupled to the wireless NICs. Each of the wireless NICs 204 can operate in a, b, g, b/g or a/b/g mode. Moreover, the sniffer 122 can have an Ethernet NIC 206 which performs Ethernet physical and MAC layer functions, an Ethernet jack 207 such as RJ-45 socket coupled to the Ethernet NIC for connecting the sniffer device to wired LAN with optional power over Ethernet or POE, and a serial port 208 which can be used to flash/configure/troubleshoot the sniffer device. A power input 209 is also provided. One or more light emitting diodes (LEDs) 210 can be provided on the sniffer device to convey visual indications (such as device working properly, error condition, undesirable wireless activity alert, and so on).

In an embodiment, sniffer 122 can be built using a hardware platform similar to that used to build an AP, although having different functionality and software. In an embodiment, both the sniffer and the AP functionality can be provided in the same hardware platform. In another embodiment, the sniffer functionality is provided as software that is run on one or more computers in the wireless network.

Server 124 (also called "security appliance") can be coupled to LAN 101 using a connection port 125. In an embodiment, each sniffer 122 can convey its information about detected wireless activity to server 124 (i.e., over one or more computer networks). Servers 124 can then analyze that information, store the results of that analysis, and process the results. In another embodiment, sniffer 122 may filter and/or summarize its information before conveying it to server 124. Sniffer 122 may also receive specific instructions from server 124, e.g. tuning to specific radio channel, detecting transmission of specific packets on a radio channel, indication about undesirable wireless activity etc. In an alternative embodiment, the sniffer 122 can operate as a standalone device without having to communicate with the server.

Figure 3:
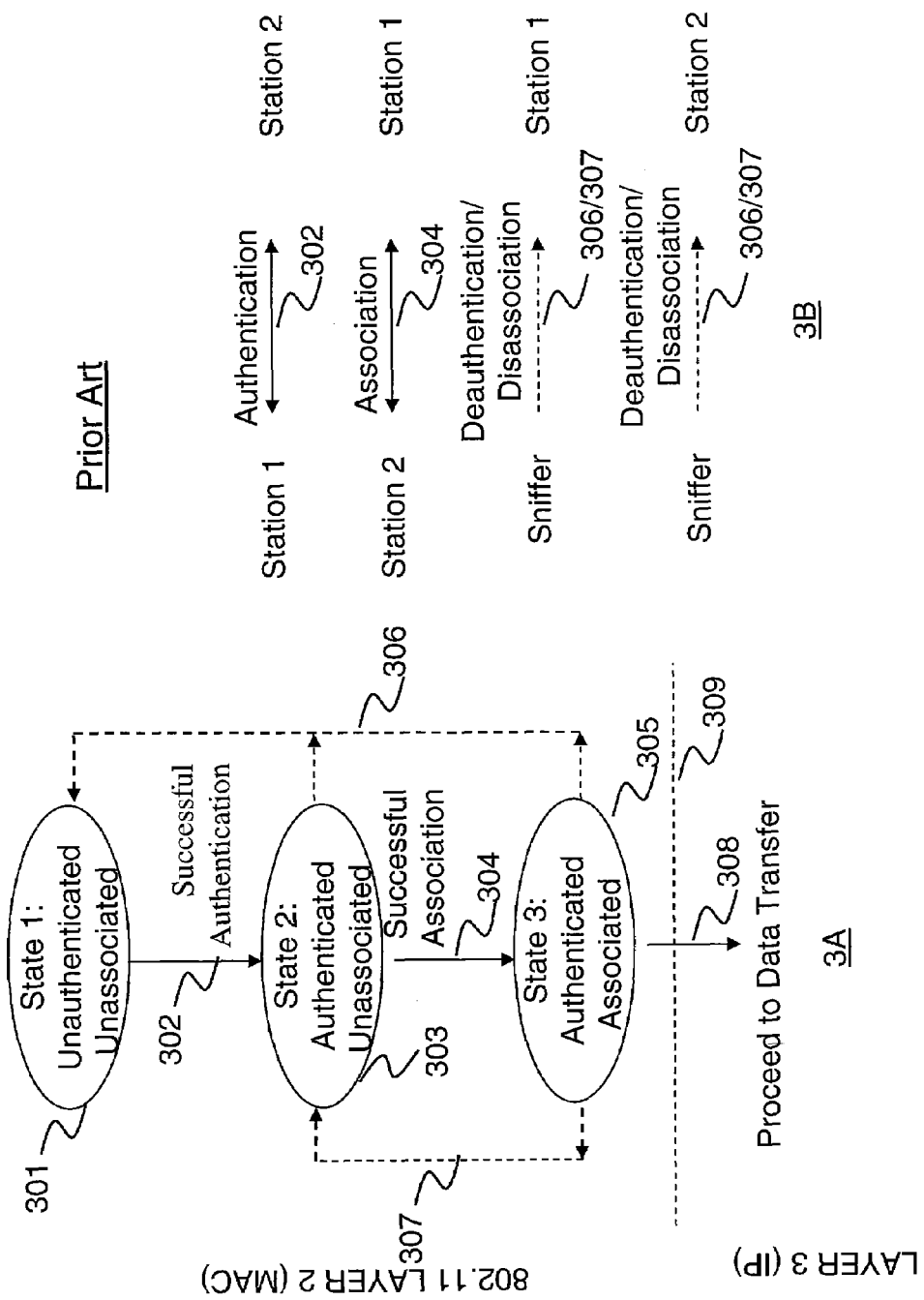
FIG. 3 illustrates certain conventional technique to disrupt undesirable wireless communication.

According to a specific embodiment, the present invention provides a method for disrupting undesirable wireless communication of devices associated with LAN 101. Prior solutions have attempted to provide mechanisms for disrupting undesirable wireless communication, with varying degrees of success. One conventional technique to disrupt undesirable wireless communication works by attempting to break undesirable wireless connection (e.g. ad hoc wireless connection, connection of authorized clients in the LAN to external APs, connection of unauthorized clients to APs in the LAN etc.) at layer 2 (i.e. IEEE 802.11 MAC) protocol level. For example, the sniffer can send one or more deauthentication messages and/or disassociation messages to one connection endpoint by spoofing the MAC address of the other connection endpoint. This conventional technique is illustrated in FIG. 3. This diagram is merely an example, which should not unduly limit the scope of the claims. One of ordinary skill in the art would recognize many variations, alternatives, and modifications.

FIG. 3 illustrates certain conventional technique to disrupt undesirable wireless communication. For example, 3A represents state transitions that an 802.11 wireless station (AP or client device) undergoes before initiating data transfer (e.g. layer 3 or IP data packets). State 301 shows the initial state of the station. In this state the station is turned on and not initiated wireless connection establishment with another device. When the station wants to engage in wireless communication with another device, it can perform authentication procedure with that station. After performing a successful authentication procedure 302, the station can move to state 303. Further, the station can perform association procedure 304 with the other device to proceed to the state 305. After this step, the station can proceed for data transfer (308). Certain conventional techniques work by sending layer 2 or MAC level connection break messages such as IEEE 802.11 deauthentication (306) or disassociation (307) messages (e.g. from the sniffer device to one or both the endpoints of the connection).

This is further illustrated in 3B. Station 1 can perform authentication procedure 302 with station 2. The two stations can then perform association procedure. On successful authentication and association, the stations can be ready for data transfer. However, sniffer can use the conventional technique of sending deauthentication or disassociation messages to disrupt the data transfer. That is, the sniffer can send spoofed deauthentication or disassociation packet to station 2 that appears to have come from station 1 (e.g. by including MAC address of station 1 as the source MAC address in the packet). Alternatively or additionally, the sniffer can send spoofed deauthentication packet to station 1 that appears to come from station 2. As a result, one or both stations can go to state 1 (301) or state 2 (303) and data transfer between them can get disrupted.

There are numerous limitations of this conventional technique which have been identified by the present applicants. These limitations are described throughout the present specification and more particularly below. One limitation is that in the conventional technique, deauthentication or disassociation messages need to be sent at a high frequency. This is because, when the connection is broken by the deauthentication or disassociation message, the device can quickly rebuild the connection (for example, in certain cases as quickly as 50 milliseconds). The need to send deauthentication or disassociation messages at high frequency consumes shared wireless bandwidth and also consumes considerable computing resources on the sniffer.

Another limitation of this conventional technique which has been identified by the present applicants is the inability of this conventional technique to disrupt certain ad hoc communication which is based on connectionless layer 2 protocol. That is, the IEEE 802.11 MAC standard provides for ad hoc communication mode that is free from the state transitions through states 303 (i.e. state 2) and 305 (i.e. state 3) illustrated in FIG. 3. For example, one wireless station can send packet to another wireless station using ad hoc communication without having to perform the authentication and association procedures. When there are no authentication and association procedures required, the ad hoc connection cannot be disrupted by deauthentication and disassociation messages as in the prior art technique.

Yet another limitation of this conventional technique which has been identified by the present applicants is that this conventional technique is unable to disrupt undesirable wireless communication in the presence of AP hopping. For example, suppose that there are two external APs, AP1 and AP2 either on the same or different channels, and an authorized client is undesirably connected to AP1. Suppose further that the conventional technique breaks layer 2 connection between the client and the AP1. In response to layer 2 connection break, the authorized client now attempts and preferably succeeds to establish a new layer 2 connection with AP2. When the conventional technique detects and breaks the layer 2 connection between the client and the AP2. The client can now come back to AP1. Between the consecutive switching of layer 2 connection, the client can in fact can perform substantial data transfer. That is, the conventional technique is not able to cause substantial disruption to undesirable communication between the client and the network (e.g. neighbor's network) where AP1 and AP2 can be connected.

One another conventional technique to disrupt ad hoc wireless communication based on connectionless layer 2 protocol also operates at layer 2. In this technique called "selective virtual jamming" the sniffer takes control of the wireless bandwidth and arbitrates it among the wireless stations, preferably starving the stations associated with undesirable ad hoc wireless communication. However, such synchronous arbitration of wireless bandwidth causes degradation in throughput of authorized communication (e.g. station may get the transmission opportunity when it does not need it and may not get it when it needs it). Another limitation of this conventional technique which has been identified by the present applicants comes from certain wireless devices (e.g., laptop devices using chipsets such as those called Centrino™ devices manufactured by Intel Corporation of Santa Clara, Calif.) that hop channels when they encounter obstruction to ad hoc wireless communication on one channel. The conventional technique is not able to disrupt undesirable ad hoc wireless connection in the presence of channel hopping due to latencies involved in detecting change in channel of undesirable communication and chasing it to the new channel.

The present invention provides systems and techniques to disrupt undesirable wireless communication which overcome the foregoing and other limitations we have discovered in relation to the conventional techniques. In an embodiment, the technique of present invention does not attempt to disrupt undesirable communication at layer 2 (IEEE 802.11 MAC) protocol level, rather works by disrupting the undesirable wireless communication at one or more communication protocol levels such as ARP (Address Resolution Protocol), IP (Internet Protocol, also called layer 3 protocol level, TCP (Transmission Control Protocol), UDP (User Datagram Protocol) and application level protocols such as FTP (File Transfer Protocol), HTTP (Hyper Text Transfer Protocol) and so on. Preferably layer 2 protocol level communication (e.g. wireless link) is maintained. This technique can inflict prolonged disruption with fewer number of messages transmitted from the sniffer (e.g. few seconds or even minutes per message compared to tens of milliseconds per message in the conventional technique). Further it can disrupt even the ad hoc wireless communication using connectionless layer 2 protocol. The technique of present invention can inflict substantial disruption on undesirable communication even in the presence of AP hopping, channel hopping and so on. Moreover, it does not affect throughput of authorized communication. Advantageously, the present invention provides much improved technique compared to the prior art.

In an embodiment, the present invention uses certain technique of "ARP poisoning" in a novel way to protect local area network environments from wireless security breaches. This technique of "ARP poisoning" works by corrupting data in the Address Resolution Protocol (ARP) cache in the station. The ARP cache in the station stores mapping between IP address and MAC address for one or more other stations. When the station wants to transmit IP packet to certain IP address destination, it refers to the ARP cache to infer the MAC address of the destination station and then transmits the packet to that MAC address (e.g. in Ethernet frame, IEEE 802.11 frame etc.). If the ARP cache is corrupted, i.e., ARP cache entry corresponding to certain destination IP address provides incorrect MAC address, the packet will be transmitted to the incorrect MAC address and will not be received by the intended destination station (having certain IP address).

The ARP caches in the stations are populated using ARP messages (as described in the RFC0826 specification of the Internet Engineering Task Force (IETF)). For example, the ARP request is used by a requester device to query the MAC address corresponding to a given IP address and is a broadcast message on the network. The ARP reply is sent to the requester by the device that owns the given IP address. The ARP reply is usually a unicast message to the requester and contains the MAC address of the responder. In this embodiment ARP Poisoning can be inflicted by sending ARP reply which indicates incorrect mapping between IP address and MAC address. In an alternative embodiment, the stations in the network which receive the broadcast ARP request can populate their ARP cache using sender information (i.e. mapping between IP address and MAC address of the sender) in the ARP request. In this embodiment, ARP poisoning can be inflicted by sending ARP request indicating incorrect mapping between the IP address and the MAC address of the sender.

Figure 4A:
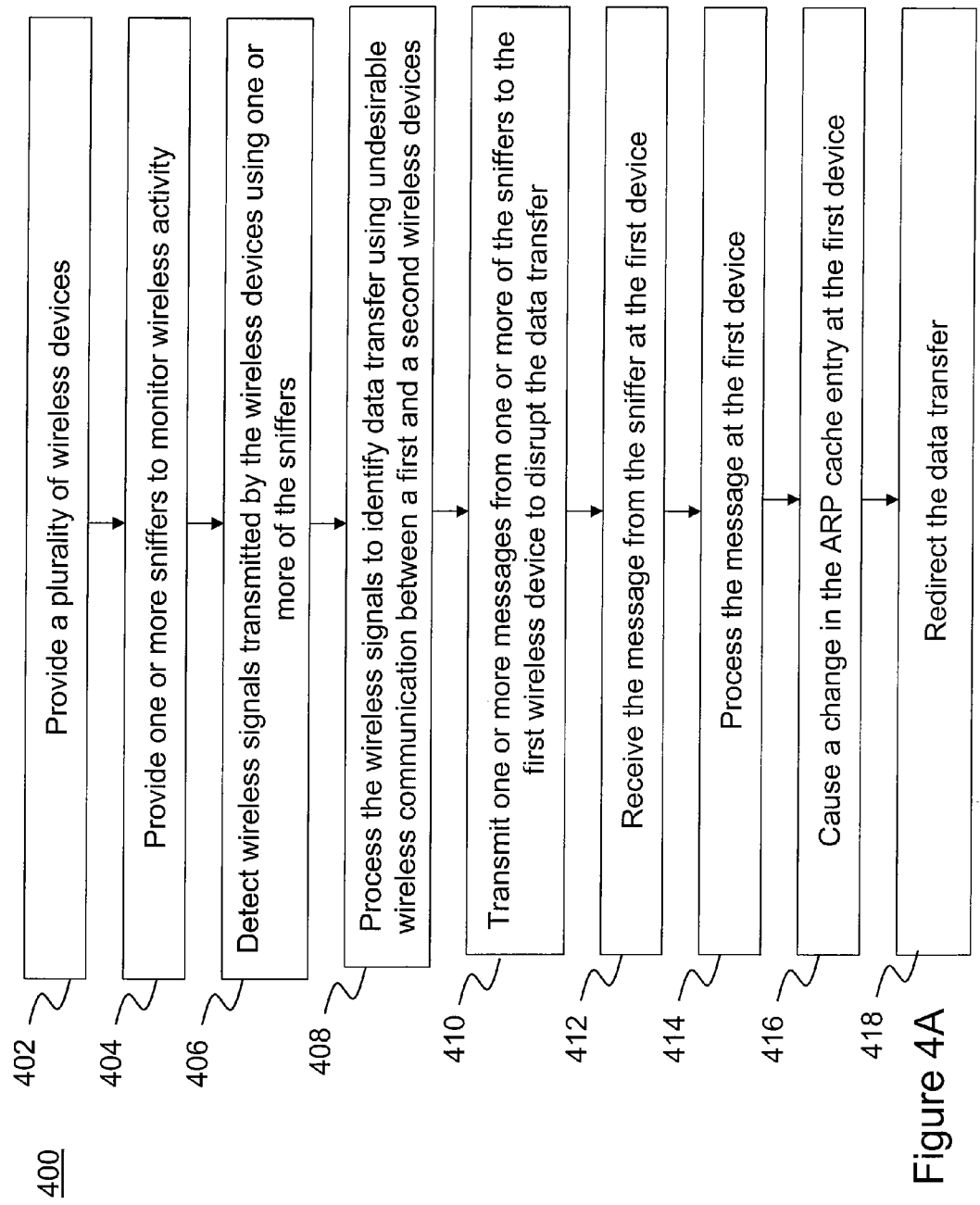
FIG. 4A illustrates a simplified method for disrupting data transfer using undesirable wireless communication utilizing an ARP poisoning process according to an embodiment of the present invention.

A simplified method 400 for disrupting undesirable wireless communication according to an embodiment of the present invention is illustrated in FIG. 4A. This diagram is merely an example, which should not unduly limit the scope of the claims. One of ordinary skill in the art would recognize many variations, alternatives, and modifications.

Step 402 can provide a plurality of wireless devices (e.g. APs, laptops, PDAs, mobile phones etc.) within and/or in a vicinity of a selected local geographic region (e.g. office, commercial area, campus, apartment, hospital etc.). Preferably the selected local geographic region comprises a local area network (e.g. corporate network, university network, hot spot network etc.). The plurality of wireless devices can include authorized devices (i.e. authorized devices associated with the local area network such as employee/student/customer laptops) and/or unauthorized devices (i.e. devices on street, parking lot, neighboring premises) which are not allowed in the local area network.

Preferably certain wireless communication among two or more of these wireless devices is undesirable. For example, the undesirable wireless communication can include ad hoc wireless communication (e.g. between authorized and unauthorized laptops/PDAs, between authorized laptops/PDAs and the like). As another example, the undesirable wireless communication can include infrastructure mode wireless communication (e.g. between authorized laptop and external AP, between unauthorized laptop and authorized AP and the like).

In order to detect and disrupt the undesirable wireless communication, step 404 can provide one or more sniffers. The sniffers are spatially distributed within and/or in a vicinity of the selected local geographic region for monitoring wireless activity. The sniffers can detect wireless signals transmitted from the plurality wireless devices (step 406). For example, the wireless signals can comprise IEEE 802.11 style frames (control frames, management frames, data frames etc.). In an embodiment, the IEEE 802.11 style data frame includes IP packet payload.

The sniffers can process the detected wireless signals to determine occurrence of data transfer using undesirable wireless communication between a first wireless device and a second wireless device, as shown at step 408. In an embodiment, the processing can comprise determining values of one or more fields in the detected 802.11 style frame (e.g. source/ transmitter and destination/receiver MAC addresses, BSSID address, TO DS flag, FROM DS flag, information associated with IP packet included in the frame and others). As merely an example, if both the flags TO DS and FROM DS are equal to 0 in the 802.11 data frame it indicates that the frame is associated with ad hoc wireless communication. As another example, if the value of the flag TO DS is not equal to the value of the flag FROM DS in the 802.11 data frame it indicates that the frame is associated with infrastructure mode wireless communication. As yet another example, if the IBSS (Independent Basic Service Set) flag is equal to 1 (or 0) in the 802.11 beacon frame, it indicates that the station transmitting the beacon frame is associated with ad hoc (or infrastructure) wireless communication.

Moreover the source (transmitter) and the destination (receiver) MAC addresses in the frame can reveal identities of the devices associated with the data transfer. Additionally, the IP addresses of the devices associated with the data transfer can be inferred from the information associated with IP packets included in the 802.11 frames.

At step 410, one or more of the sniffers can transmit one or more messages to the first wireless device directed to disrupting the data transfer over the undesirable wireless communication. Step 412 can receive the message from the sniffer at the first wireless device and step 414 can process the message at the first wireless device. In a preferred embodiment, the message comprises an ARP request message, an ARP reply message or a gratuitous ARP message.

The processing of the message causes a change in one or more entries in one or more memories associated with the first wireless device (step 416). The one or more entries is preferably associated with the second wireless device. In a preferred embodiment, the one or more entries comprises ARP cache entry associated with the second wireless device.

In an embodiment, the ARP cache entry associated with the second wireless device provides relation between an IP address and a MAC address of the second wireless device. In this embodiment, causing a change in the ARP cache entry includes changing the MAC address in the ARP cache entry associated with the second wireless device. In a preferred embodiment, the MAC address in the ARP cache entry is changed to a new value that is different from the actual MAC address of the second wireless device. In an embodiment, the new value can be a MAC address of a device different from the second wireless device. In an alternative embodiment, the new value can be an arbitrary MAC address.

In another embodiment, the ARP cache entry associated with the second wireless device provides relation between an IP address and a MAC address of a computer system (host, gateway router etc.) coupled to the second wireless device. That is, the first wireless device communicates with the second wireless device using wireless communication and the second wireless device further communicates (i.e. perform bridging of traffic) with the computer system in the network. In this embodiment, causing a change in the ARP cache entry includes changing the MAC address in the ARP cache entry to a new value that is different from the actual MAC address of the computer system.

Due to the change caused in step 416, the data transfer from the first wireless device is redirected (step 418). The redirection preferably causes disruption to the data transfer (e.g. the data transfer between the first and the second wireless devices, between the first wireless device and the computer system coupled to the second wireless device and the like). In a specific embodiment, the IP packet addressed to the IP address of the second wireless device is actually transmitted to the new value of the MAC address. In another specific embodiment, the IP packet addressed to the IP address of the computer system coupled to the second wireless device is actually transmitted to the new value of the MAC address.

Figure 4B:
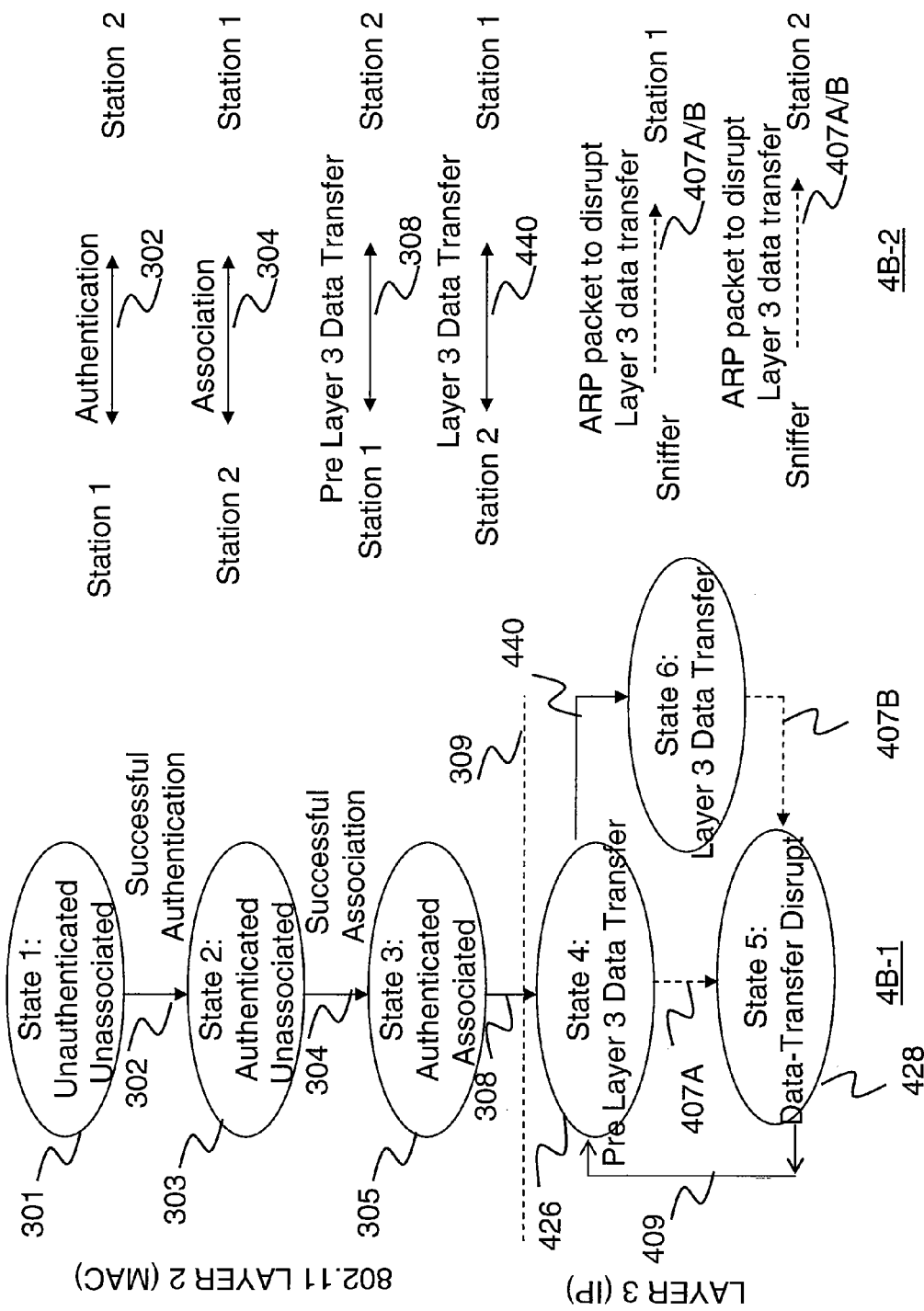
FIG. 4B illustrates a simplified state diagram and a simplified message diagram for disrupting data transfer using undesirable wireless communication utilizing an ARP poisoning process according to an embodiment of the present invention.

FIG. 4B illustrates a simplified state diagram (4B-1) and a simplified message diagram (4B-2) for disrupting undesirable wireless communication according to an embodiment of the present invention. These diagrams are merely examples, which should not unduly limit the scope of the claims. One of ordinary skill in the art would recognize many variations, alternatives, and modifications.

As shown in the state diagram 4B-1, the steps 301 to 308 can perform the layer 2 (IEEE 802.11 MAC) connection establishment procedures and the station transitions to state 426 (state 4). In an alternative embodiment (e.g. ad hoc communication using connectionless layer 2 protocol), the station can transition from state 1 to state 4 without having to go through states 2 and 3. At state 426 (state 4), the station has completed MAC level connection establishment and is preparing to communicate with another station at a network level i.e. layer 3 or IP level. In an embodiment, at state 4, the station performs ARP communication and populates one or more entries in an ARP cache (also called as ARP table) in its memory. For example, the entry in the ARP cache can indicate relation between an IP address and a MAC address of the other station. Transition 407A indicates that the present invention can disrupt communications of a station by sending one or more ARP messages from the sniffer directed to corrupt data in the ARP cache of the station. As a result, the station enters state 428 (state 5). At state 5, the IP packets transmitted by the station are redirected (e.g. away from their intended destination which can be the other station) and the communication is disrupted. A station can get to state 4 as indicated by transition 409, for example, after a timeout period of the ARP cache (e.g. 30 seconds). From state 4, the station can again go to state 5 when it receives one or more ARP packets from the sniffer that are directed to corrupt data in ARP cache. In an alternative embodiment, the station can transition from state 4 to state 6 as indicated by transition 440. At state 6, the station can transmit and receive IP packets. Moreover at state 6, the station can receive one or more ARP packets from the sniffer that are directed to corrupt data in ARP cache and transition 407B to state 5 can take place.

This is further illustrated in 4B-2. Station 1 can perform authentication procedure 302 with station 2. The two stations can then perform association procedure. On successful authentication and association, the stations can be ready for data transfer. When data arrives either at station 1 or station 2 to be forwarded to the other station, the station can perform ARP request/response transaction as shown by 308. The station can then send IP packet to the other station. When the sniffer identifies IP address of station 1 and/or station 2, it can send ARP packets directed to corrupt data in the ARP cache of station 1 and/or station 2. For example, the sniffer can send one or more ARP packet (request packet and/or response packet) to station 1 indicating that the IP address of station 2 is associated with a MAC address different from the actual MAC address of the station 2 and/or vice versa (as indicated by 407A and 407B). This results in the packet transmitted by station 1 and intended for station 2 to be redirected to the MAC address provided in the ARP packet transmitted by the sniffer and/or vice versa. As can be seen, the layer 2 states of the stations are not affected, i.e., the stations can be in a connected state at MAC level and hence may not attempt reconnection, AP hopping, channel hopping and the like.

Figure 4C:
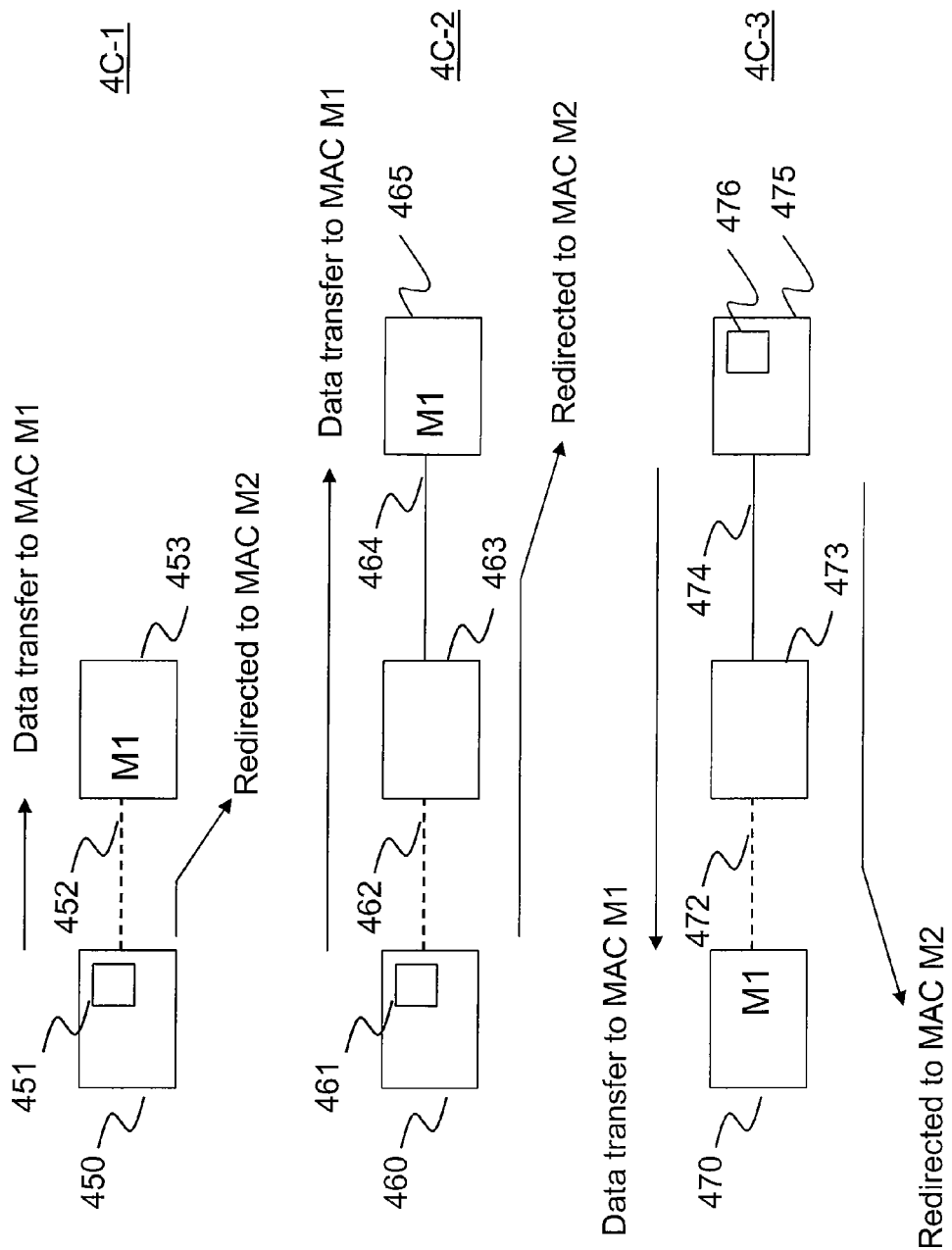
FIG. 4C illustrates a simplified network diagram that can facilitate disrupting data transfer using undesirable wireless communication utilizing an ARP poisoning process according to an embodiment of the present invention.

FIG. 4C illustrates a simplified network diagram that can facilitate disrupting data transfer using undesirable wireless communication according to an embodiment of the present invention. This diagram is merely an example, which should not unduly limit the scope of the claims. One of ordinary skill in the art would recognize many variations, alternatives, and modifications. As shown in network diagram 4C-1, wireless devices 450 and 453 perform data transfer over wireless link 452. In an embodiment, the wireless link 452 can be provided using ad hoc wireless communication (e.g. devices 450 and 453 can be laptop computers). In an alternative embodiment, the wireless link 452 can be provided using infrastructure mode wireless communication (e.g. the device 450 can be a laptop computer and the device 453 can be an access point or vice versa). As shown the MAC address (e.g. wireless MAC address) of the device 453 can be 'M1'. The ARP cache 451 in the device 450 can indicate relation between the IP address and the MAC address of the device 453. After the sniffer sends one or more ARP messages to disrupt the data transfer, the ARP cache 451 in the device 450 can indicate a MAC address 'M2' for the device 453. Preferably, 'M2' is not equal to 'M1'. Consequently, the data transfer from the device 450 that is intended for the IP address of the device 453 is redirected to the MAC address 'M2'. The data transfer can thus be disrupted.

As shown in network diagram 4C-2, the data transferred by a device 460 to a device 463 over wireless link 462 is intended for a device 465. In an embodiment, the device 465 is coupled to the device 463 using wired computer network. As merely an example, the device 460 can be a laptop computer, the device 463 can be an access point device and the device 465 can be a host computer or a gateway router device. As shown the MAC address of the device 465 can be 'M1'. The ARP cache 461 in the device 460 can indicate relation between the IP address and the MAC address of the device 465. After the sniffer sends one or more ARP messages to disrupt the data transfer, the ARP cache 461 in the device 460 can indicate a MAC address 'M2' for the device 465. Preferably, 'M2' is not equal to 'M1'. Consequently, the data transfer from the device 460 that is intended for the IP address of the device 465 is redirected to the MAC address 'M2'. The data transfer can thus be disrupted.

In an alternative embodiment shown in network diagram 4C-3, the data transferred by a device 475 to a device 473 and further transferred by the device 473 to a device 470 over wireless link 472 is intended for a device 470. In an embodiment, the device 475 is coupled to the device 473 using wired computer network. As merely an example, the device 470 can be a laptop computer, the device 473 can be an access point device and the device 475 can be a host computer or a gateway router device. As shown the MAC address (e.g. wireless MAC address) of the device 470 can be 'M1'. The ARP cache 476 in the device 475 can indicate relation between the IP address and the MAC address of the device 470. After the sniffer sends one or more ARP messages to disrupt the data transfer, the ARP cache 476 in the device 475 can indicate a MAC address 'M2' for the device 470. Preferably, 'M2' is not equal to 'M1'. Consequently, the data transfer from the device 475 that is intended for the IP address of the device 470 is redirected to the MAC address 'M2'. The data transfer can thus be disrupted.

Figure 5A:
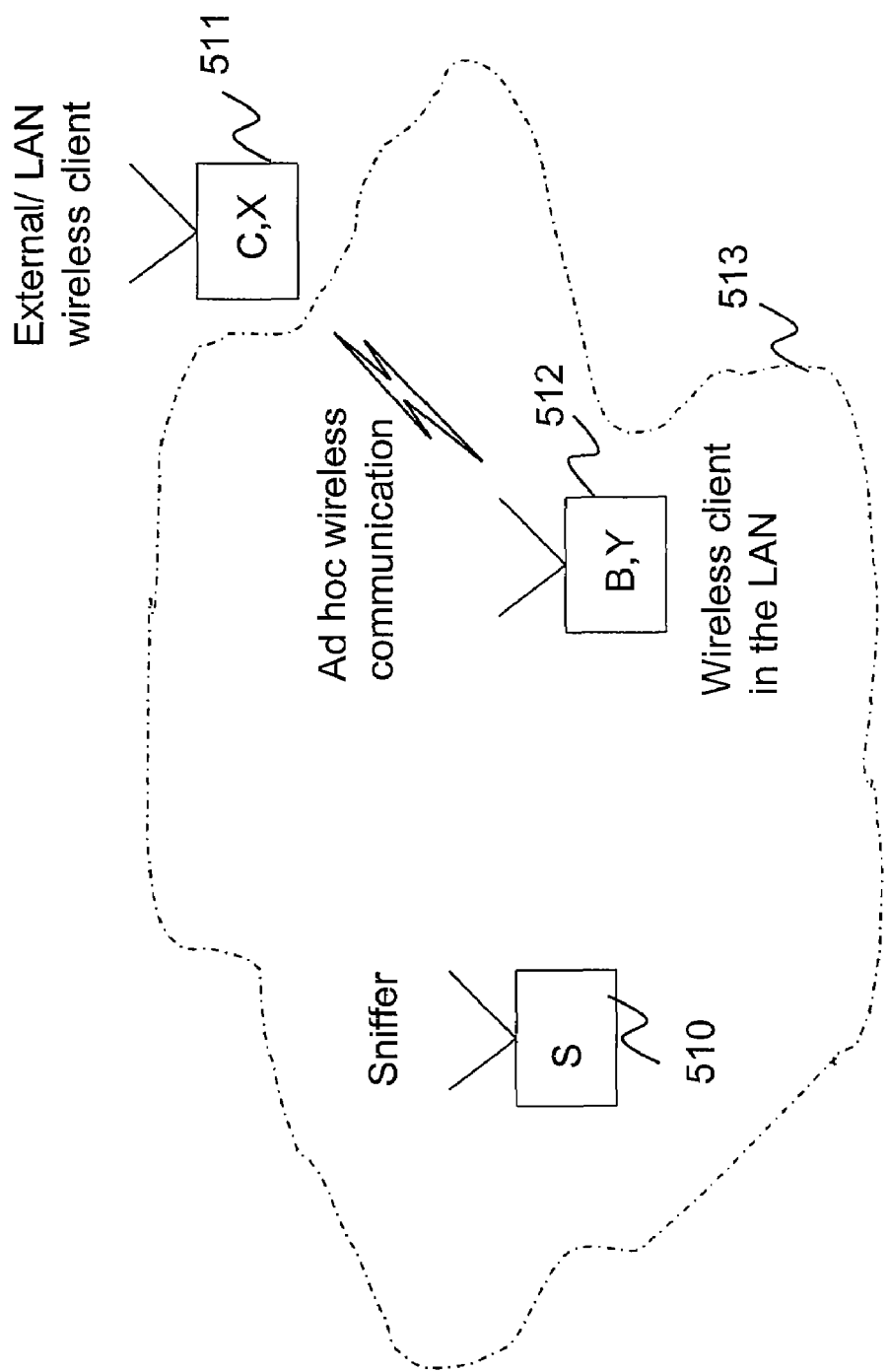
FIG. 5A provides a simplified network diagram including ad hoc wireless communication that can facilitate disrupting undesirable communication according to an embodiment of the present invention.

FIG. 5A provides a simplified network diagram including ad hoc wireless communication that can facilitate disrupting undesirable wireless communication according to an embodiment of the present invention. This diagram is merely an example, which should not unduly limit the scope of the claims. One of ordinary skill in the art would recognize many variations, alternatives, and modifications. As shown, a geographic region 513 can correspond to the region of radio coverage of a sniffer 510. That is, the sniffer 510 can detect one or more wireless transmissions from a source within the region 513. The geographic region 513 can comprise an authorized wireless device 512 (with IP address 'B' and MAC address 'Y') and a sniffer 510. The figure also shows an unauthorized wireless device 511 with MAC address 'X' and IP address 'C' that communicates with the authorized device 512 using wireless ad hoc wireless communication. Notably the device 511 can be outside (as shown) or inside (not shown) the geographic region 513. That is, the packets transmitted from the device 511 may or may not be visible to the sniffer 510.

Figure 5B:
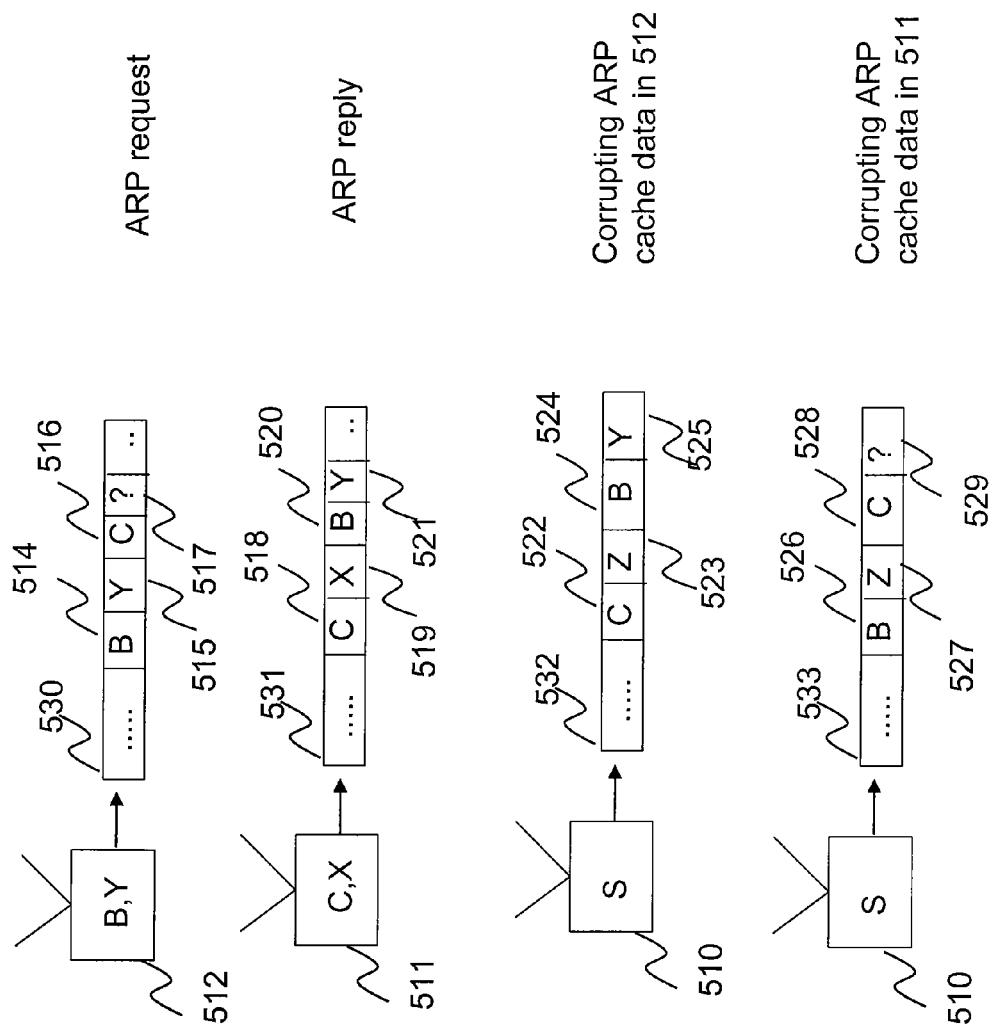
FIG. 5B provides a simplified message diagram for disrupting data transfer using ad hoc wireless communication of FIG. 5A utilizing an ARP poisoning process according to an embodiment of the present invention.

FIG. 5B provides a simplified message diagram for disrupting ad hoc wireless communication illustrated in FIG. 5A according to an embodiment of the present invention. This diagram is merely an example, which should not unduly limit the scope of the claims. One of ordinary skill in the art would recognize many variations, alternatives, and modifications. As shown, the station 512 (in FIG. 5B) transmits an ARP request packet 530 requesting to know the MAC address of station 511. The packet can include IP address of the station 512 in the source IP address field 514, MAC address of the station 512 in the source MAC address field 515, and the IP address of the station 511 in the target IP address field 516. The packet will be broadcast at layer 2 to all recipients in the same subnet. The station 511 responds to station 512 with ARP reply packet 531. The ARP reply packet includes the IP address of the station 511 in the source IP address field 518, and its MAC address in the source MAC address field 519 which the station 512 is seeking. The stations 512 and 511 can then perform IP packet exchange.

The sniffer 510 can detect this packet exchange and can determine the IP addresses and the MAC addresses of the stations involved. Moreover the sniffer can transmit ARP packets (e.g., 532 or 533) directed to disrupt this communication. For example, the sniffer 510 can transmit ARP reply packet 532 to the station 512 including following information: IP address 'C' of the station 511 in field 522, incorrect MAC address 'Z' of the station 511 in field 523, IP address 'B' of the station 512 in field 524, and MAC address 'X' of the station 512 in the field 525. As a result, the station 512 updates its ARP cache with an incorrect entry (i.e., MAC address 'Z' for IP address 'C' of the station 511) and communication between stations 511 and 512 them can get disrupted.

Alternately, the sniffer 510 can send an ARP request packet 533 including the IP address 'B' of the station 512 in the source IP address field 526, an incorrect MAC address 'Z' of the station 512 in the source MAC address field 527, and the IP address 'C' of the station 511 in the target IP address field 528. This packet can be broadcast to all participants of the ad hoc network and can disrupt their communication to the station 512.

In alternative embodiments, the sniffer 510 can send combination of ARP request and reply packet. Also these packets can be sent to unicast or broadcast addresses. Moreover, the ARP packets directed to disrupt the wireless communication can be transmitted by the sniffer at regular intervals to ensure that the communication continues to be disrupted. In an alternative embodiment, they can be transmitted by the sniffer upon detecting a layer 3 data packet associated with the undesirable wireless communication (e.g. state 6 in FIG. 4B).

Figure 6A:
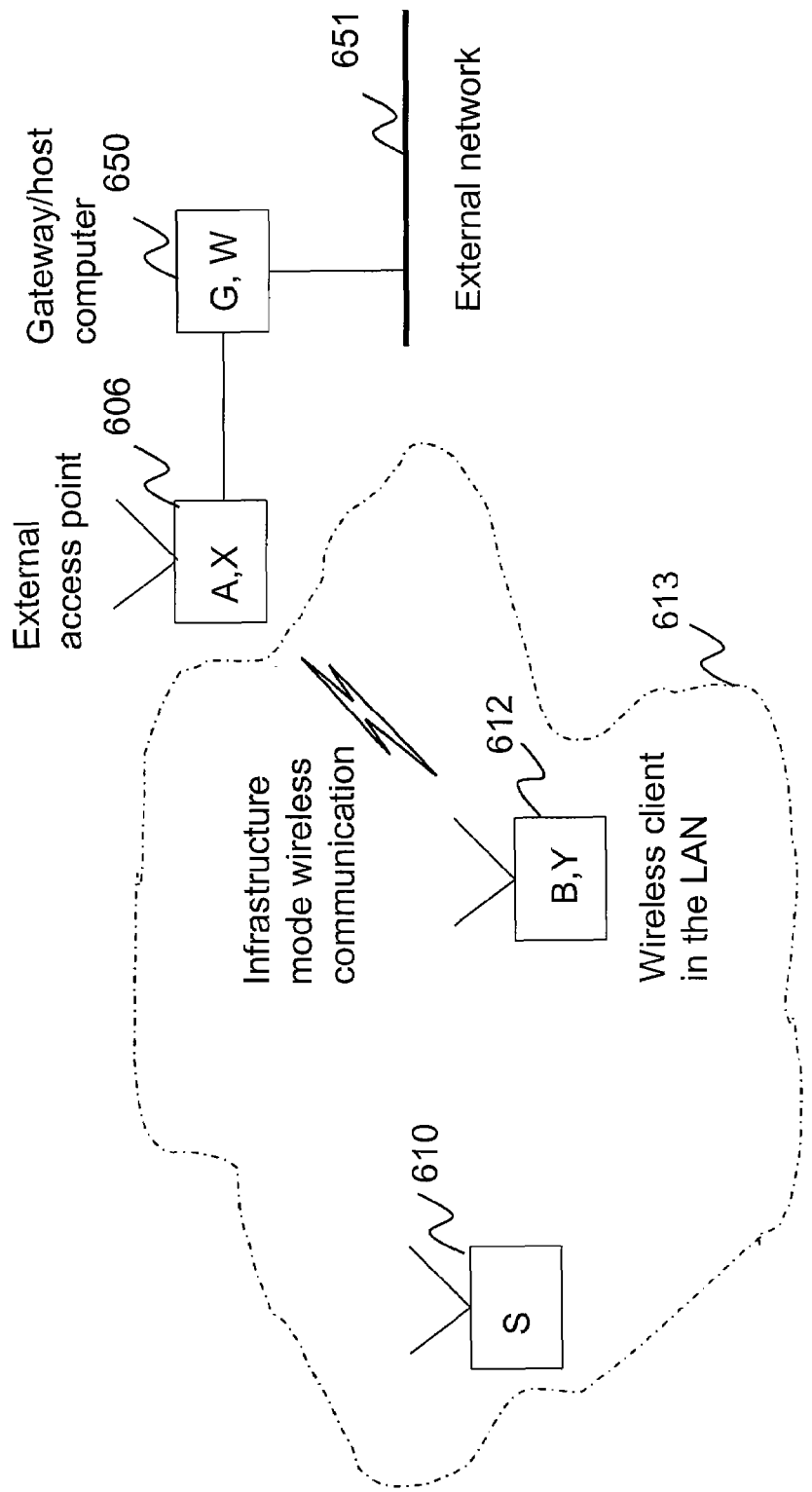
FIG. 6A provides a simplified network diagram including infrastructure mode wireless communication that can facilitate disrupting undesirable communication according to an embodiment of the present invention.

FIG. 6A provides a simplified network diagram including a wireless client in the LAN communicating with an external AP that can facilitate disrupting wireless communication according to an embodiment of the present invention. This diagram is merely an example, which should not unduly limit the scope of the claims. One of ordinary skill in the art would recognize many variations, alternatives, and modifications. As shown, a geographic region 613 can correspond to the region of radio coverage of a sniffer 610. That is, the sniffer 610 can detect one or more wireless transmissions from a source within the region 613. As shown, the geographic region 613 can comprise an authorized wireless device 612 (with IP address 'B' and MAC address 'Y'). The figure also shows an external wireless AP device 606 with MAC address 'X' and IP address 'A'. For example, the AP 606 can be an access point in the neighboring premises, street, parking lot etc. The AP 606 may be benign or malicious. Preferably the authorized client 612 communicates with the AP 606 using infrastructure mode wireless communication. Preferably, this communication is undesirable and needs to be disrupted to avoid security breaches through such communication. Notably, the AP 606 can be outside (as shown) or inside (not shown) the geographic region 613. That is, the packets transmitted from the device 606 may or may not be visible to the sniffer 610.

As shown in the FIG. 6A, the AP 606 is coupled to the gateway device 650 with MAC address 'W' and IP address 'G'. In an alternative embodiment, the device 650 can be a host computer device. The AP 606 preferably performs bridging of traffic between the wireless medium and the device 650. Preferably, the device 650 is coupled to the external network 651.

Figure 6B:
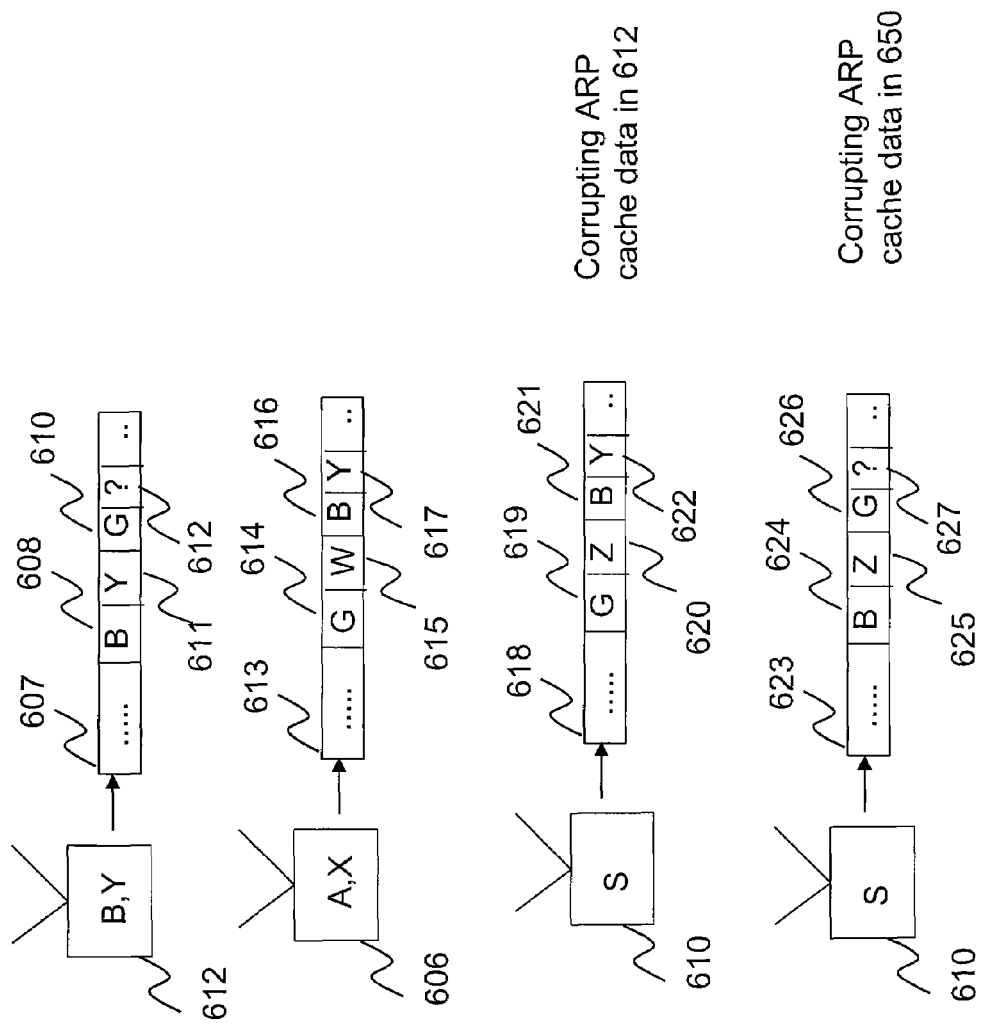
FIG. 6B provides a simplified message diagram for disrupting data transfer using infrastructure mode wireless communication of FIG. 6A utilizing an ARP poisoning process according to an embodiment of the present invention.

FIG. 6B illustrates a simplified message diagram for disrupting infrastructure mode wireless communication illustrated in FIG. 6A according to an embodiment of the present invention. This diagram is merely an example, which should not unduly limit the scope of the claims. One of ordinary skill in the art would recognize many variations, alternatives, and modifications. As shown in the figure, the station 612 transmits an ARP request packet 607 seeking to know the MAC address of station 650. The packet can include IP address of the station 612 in the source IP address field 608, MAC address of the station 612 in the source MAC address field 611, and the IP address of the station 650 in the target IP address field 610. The packet will be broadcast at layer 2 to all recipients in the same subnet. The ARP request packet is bridged by the AP 606 from the wireless medium to the station 650. The station 650 responds to the station 612 with an ARP reply packet 613. The ARP reply packet includes the IP address of the station 650 in the source IP address field 614, and its MAC address in the source MAC address field 615 which the station 612 is seeking. Stations 612 and 650 can then perform IP packet exchange (e.g. through AP 606).

The sniffer 610 can detect this packet exchange and determine the IP addresses and MAC addresses of the stations involved. The sniffer can transmit one or more ARP packets (e.g., 618 or 623) directed to disrupt this communication. For example, the sniffer 610 can send ARP reply packet 618 to station 612 including following information: IP address 'G' of the station 650 in field 619, incorrect MAC address 'Z' of the station 650 in field 620, IP address 'B' of the station 612 in field 621, and MAC address 'Y' of the station 612 in field 622. As a result, the station 612 updates its ARP cache with an incorrect entry (i.e., MAC address 'Z' for IP address 'G' of the station 650) and communication between them can get disrupted.

Alternately, the sniffer 610 can send an ARP request packet 623 including the IP address 'B' of the station 612 in the source IP address field 624, an incorrect MAC address 'Z' of the station 612 in the source MAC address field 625, and the IP address 'G' of the station 650 in the target IP address field 626. In an alternative embodiment, the sniffer 610 can send combination of ARP request and reply packets. These packets can be transmitted to unicast or broadcast addresses. Moreover, the ARP packets directed to disrupt the wireless communication can be transmitted by the sniffer at regular intervals to ensure that the communication continues to be disrupted. In an alternative embodiment, they can be transmitted by the sniffer upon detecting a layer 3 data packet associated with the undesirable wireless communication (e.g. state 6 in FIG. 4B).

Figure 7:
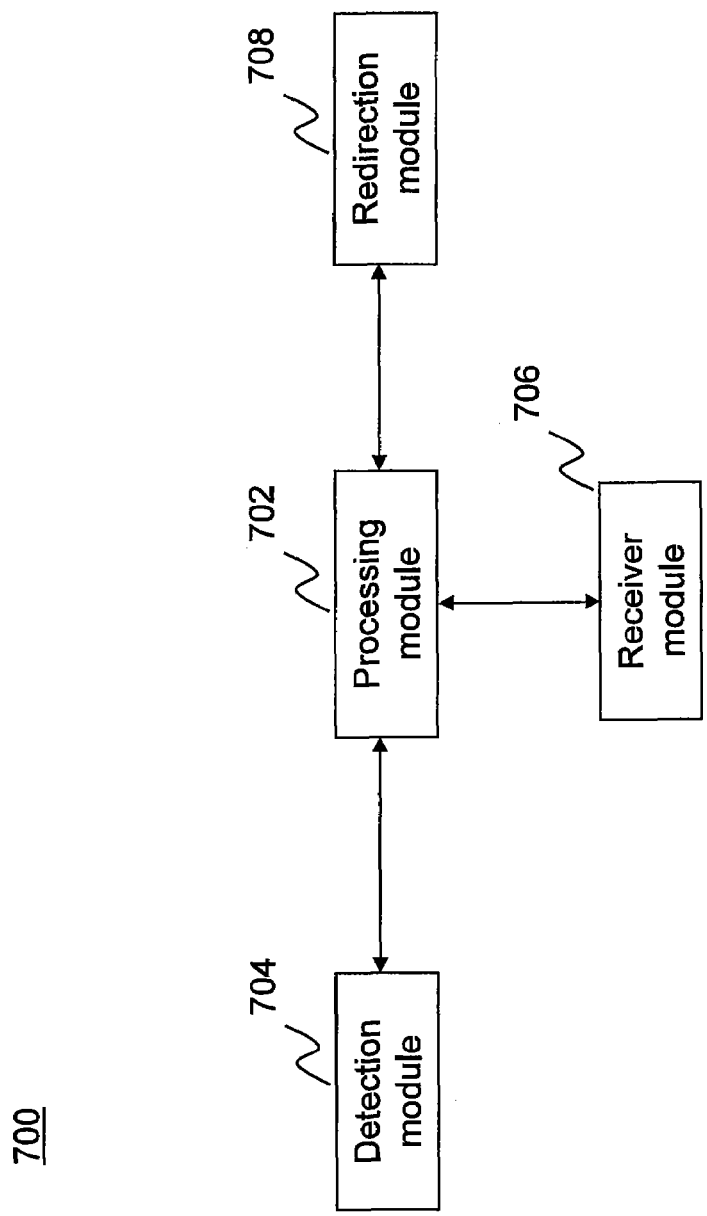
FIG. 7 illustrates a simplified apparatus for disrupting data transfer using undesirable wireless communication according to an embodiment of the present invention.

In an embodiment the technique of present invention provides an apparatus for detecting wireless transmissions from one or more wireless devices. FIG. 7 illustrates a simplified apparatus for disrupting data transfer using undesirable wireless communication according to an embodiment of the present invention. As shown the apparatus comprises a processing module (702). The processing module can include a micro processing device coupled to one or more memory devices. Moreover, the apparatus comprises a detection module (704) coupled to the processing module. The detection module is adapted to identify undesirable wireless communication between at least two wireless devices from a plurality of wireless devices. In an embodiment the detection module can comprise one or more radio interface devices. In another embodiment the detection module can comprise one or more computer executable codes (e.g. packet parsing code, security policy check code and so on).

The apparatus comprises a receiver module (706) coupled to the processing module. The receiver module is adapted to receive information associated with the undesirable wireless communication between the two wireless devices. In an embodiment the information can include at least a MAC address and an IP address of a communication device. Preferably the communication device uses the undesirable wireless communication for data transfer. The apparatus also comprises a redirection module (708) coupled to the receiver module. The redirection module is adapted to transfer one or more messages to at least one of the two wireless devices to cause a change to one or more entries in one or more memories coupled to the at least one wireless device. Preferably the change causes redirection of the data transfer. Preferably the redirection causes disruption to the data transfer. In an embodiment the one or more entries comprise entries indicated to the MAC address and the IP address of the communication device. Depending upon the embodiments, one or more of the processing module, the detection module, the receiver module, and the redirection module are provided entirely in the sniffer device, partly in the sniffer device and partly in the server appliance, or entirely in the server appliance.

Figure 8:
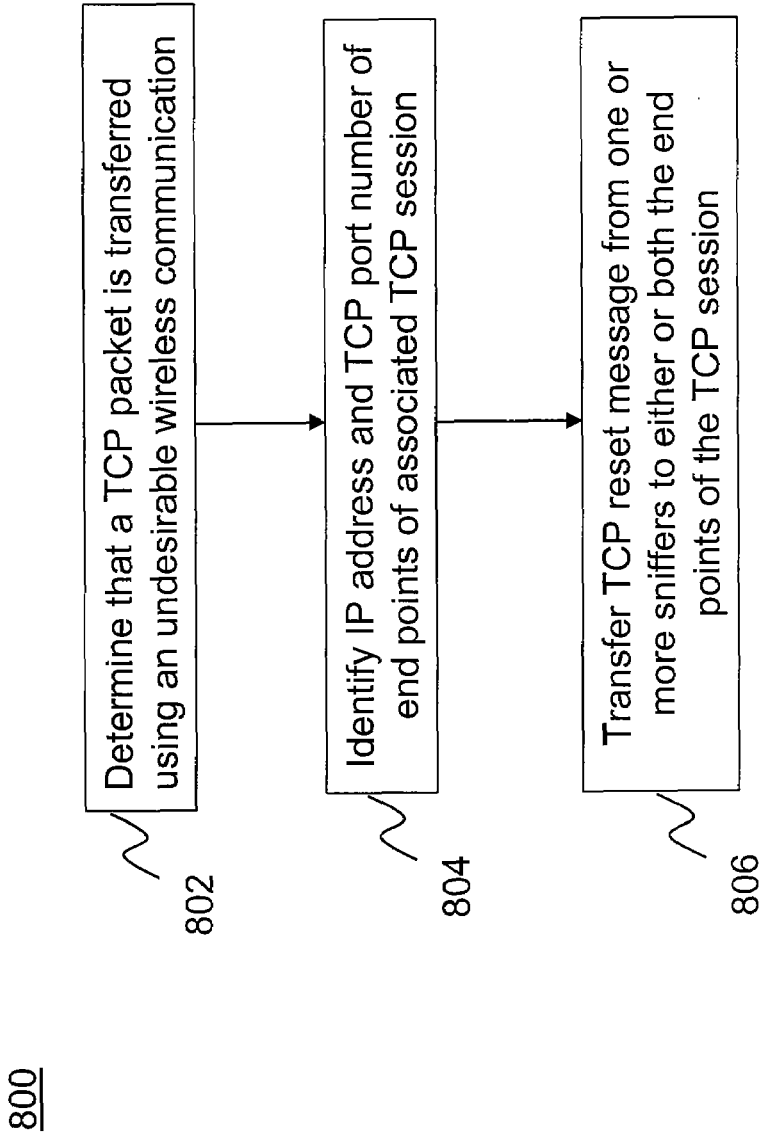
FIG. 8 illustrates a simplified method for disrupting data transfer using undesirable wireless communication utilizing a TCP reset process according to an embodiment of the present invention.

While the technique for disrupting data transfer using undesirable wireless communication utilizing ARP poisoning has been described, there are many alternative embodiments for disrupting the undesirable wireless communication in accordance with the present invention. In an embodiment the disruption can be inflicted at a TCP level. A simplified method 800 for disrupting undesirable wireless communication using a TCP reset process according to an embodiment of the present invention is illustrated in FIG. 8. This diagram is merely an example, which should not unduly limit the scope of the claims. One of ordinary skill in the art would recognize many variations, alternatives, and modifications.

Referring to FIG. 8, the method 800 includes determining that one or more TCP packets are transferred using an undesirable wireless communication (802). Preferably the TCP packets belong to a TCP session. An IP address and a TCP port number of either or both end points of the TCP session are identified from the TCP packets (804). In one embodiment, the end points of the TCP session are end points of a wireless link associated with the undesirable wireless communication. For example, two wireless clients (e.g. laptop computers, PDAs, mobile phones etc.) can be associated with undesirable ad hoc wireless communication and the two wireless clients are the end points of the wireless link as well as the end points of the TCP session. In another embodiment, one or both the end points of the TCP session can be different from the end points of the wireless link. For example, a wireless client can be associated with an undesirable infrastructure mode wireless communication with an access point which in turn is coupled to a wired portion of a computer network. The wireless client can then establish a TCP session with a computer system coupled to the computer network through the access point.

One or more sniffers can transfer one or more TCP reset messages to either or both the end points of the TCP session (806). For example, the sniffer sends TCP reset message over wireless medium to an end point of the wireless link. If the end point of the TCP session is different from the end point of the wireless link, the reset message is forwarded (e.g. using routing process) to the end point of the TCP session. The TCP reset message causes the recipient of the message to close down the TCP session. This preferably stops further data transfer over the TCP session. The TCP reset message can be formatted so that it appears to the recipient of the message that as if the message has been sent by the other end point of the session. For example, the IP address and the TCP port number of the other end point is used in the TCP reset message as source addresses. The value of sequence number field in the reset message can be chosen so that the message will be accepted by the end point of the session. For example, the value of the sequence number field can be set to a value which is within a "window" of a sequence number derived from the TCP packets of step 804. Other embodiments of resetting the TCP connection such as sending a TCP SYN message, sending a TCP message including erroneous data and so on are also possible and will be apparent to those with ordinary skill in the art.

Figure 9:
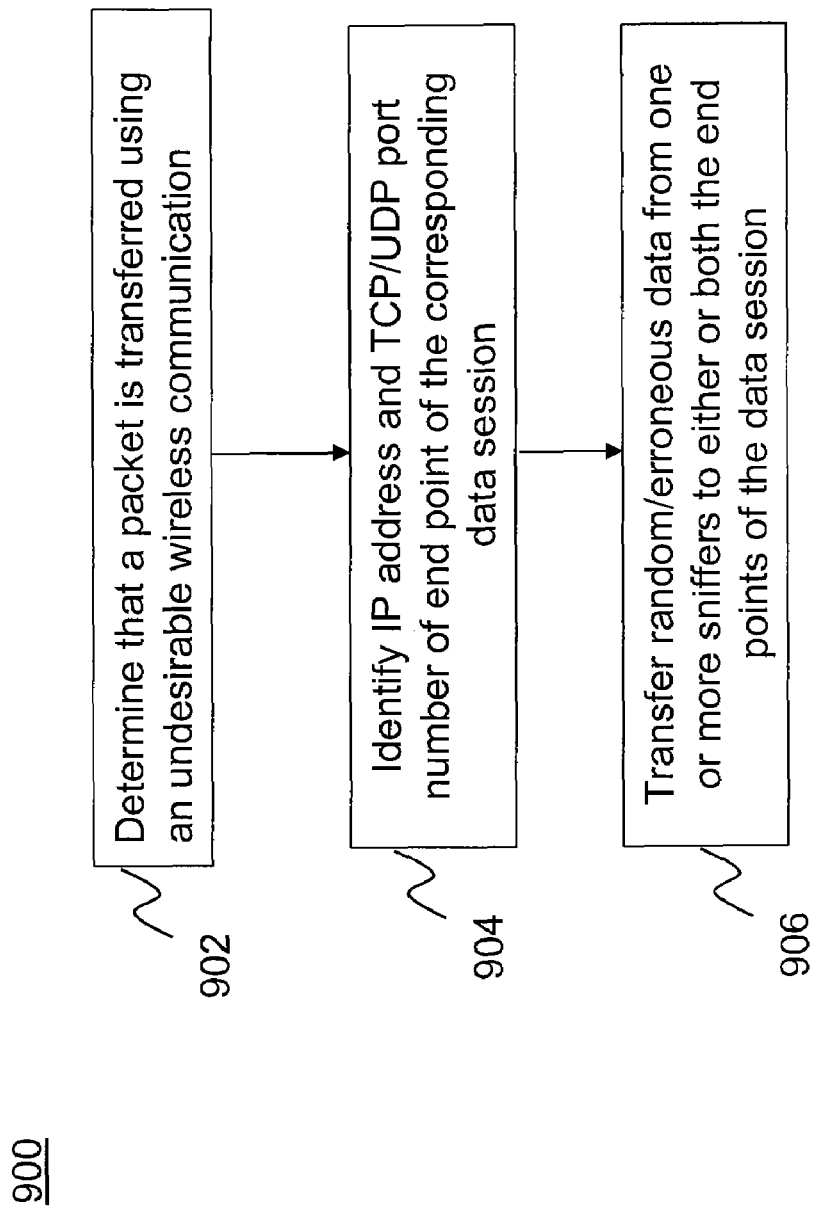
FIG. 9 illustrates a simplified method for disrupting data transfer using undesirable wireless communication utilizing a random data injection process according to an embodiment of the present invention.

In yet an alternative embodiment in accordance with the present invention, the method for disrupting undesirable wireless communication can disrupt data transfer using the undesirable wireless communication at an application protocol level (e.g. FTP, HTTP, SMTP etc.). A simplified method 900 for disrupting undesirable wireless communication according to an embodiment of the present invention is illustrated in FIG. 9. This diagram is merely an example, which should not unduly limit the scope of the claims. One of ordinary skill in the art would recognize many variations, alternatives, and modifications.

Referring to FIG. 9, the method 900 can determine that one or more data packets (e.g. TCP packets, UDP packets etc.) are transferred using an undesirable wireless communication (902). Preferably the data packets belong to a data session (e.g. TCP session, UDP session etc.). Preferably the data session is associated with an application session (e.g. FTP file transfer session, HTTP download session, SMTP email session etc.). The method further includes determining identity (e.g. IP address, TCP/UDP port number etc.) of one or both end points of the session, e.g. data session, application session etc. (904). One or more sniffers can then transfer one or more packets (e.g. TCP packets, UDP packets etc.) to either or both end points of the session (906). The transferred one or more packets can preferably include random or erroneous data. This data can corrupt the application data e.g. it can get inserted in the filed transferred using FTP, in the web page downloaded/uploaded using HTTP etc. The application data corruption disrupts the application.

The various embodiments may be implemented as part of a computer system. The computer system may include a computer, an input device, a display unit, and an interface, for example, for accessing the Internet. The computer may include a microprocessor. The microprocessor may be connected to a data bus. The computer may also include a memory. The memory may include Random Access Memory (RAM) and Read Only Memory (ROM). The computer system may further include a storage device, which may be a hard disk drive or a removable storage drive such as a floppy disk drive, optical disk drive, jump drive and the like. The storage device can also be other similar means for loading computer programs or other instructions into the computer system.

As used herein, the term 'computer' may include any processor-based or microprocessor-based system including systems using microcontrollers, digital signal processors (DSP), reduced instruction set circuits (RISC), application specific integrated circuits (ASICs), logic circuits, and any other circuit or processor capable of executing the functions described herein. The above examples are exemplary only, and are thus not intended to limit in any way the definition and/or meaning of the term 'computer'. The computer system executes a set of instructions that are stored in one or more storage elements, in order to process input data. The storage elements may also hold data or other information as desired or needed. The storage element may be in the form of an information source or a physical memory element within the processing machine.

The set of instructions may include various commands that instruct the processing machine to perform specific operations such as the processes of the various embodiments of the invention. The set of instructions may be in the form of a software program. The software may be in various forms such as system software or application software. Further, the software may be in the form of a collection of separate programs, a program module within a larger program or a portion of a program module. The software also may include modular programming in the form of object-oriented programming. The processing of input data by the processing machine may be in response to user commands, or in response to results of previous processing, or in response to a request made by another processing machine.

As used herein, the terms 'software' and 'firmware' are interchangeable, and include any computer program stored in memory for execution by a computer, including RAM memory, ROM memory, EPROM memory, EEPROM memory, and non-volatile RAM (NVRAM) memory. The above memory types are exemplary only, and are thus not limiting as to the types of memory usable for storage of a computer program.

Although specific embodiments of the present invention have been described, it will be understood by those of skill in the art that there are other embodiments that are equivalent to the described embodiments. Accordingly, it is to be understood that the invention is not to be limited by the specific illustrated embodiments.

What is claimed is:

1. A method for disrupting data transfer that occurs over wireless communications between wireless client and wireless access point, the method comprising:

detecting a layer 2 wireless link between a wireless client device and a first wireless access point, the layer 2 wireless link being used for transfer of data between the wireless client device and a networked device via the first wireless access point, the wireless client device configured for an access point hopping process, the access point hopping process being for establishing a layer 2 wireless link between the wireless client device and a second wireless access point which is different from the first wireless access point to cause the transfer of data between the wireless client device and the networked device to occur via the second wireless access point using the layer 2 wireless link between the wireless client device and the second wireless access point when the wireless client device detects disconnection in the layer 2 wireless link between the wireless client device and the first wireless access point; and disrupting the transfer of data between the wireless client device and the networked device while maintaining the layer 2 wireless link between the wireless client device and the first wireless access point, the maintaining the layer 2 wireless link being for preventing the wireless client device from detecting the disconnection in the layer 2 wireless link between the wireless client device and the first wireless access point when the transfer of data is disrupted.

2. The method of claim 1 wherein the layer 2 wireless link between the wireless client device and the first wireless access point is in accordance with an IEEE 802.11 protocol.

3. The method of claim 1 wherein the layer 2 wireless link between the wireless client device and the second wireless access point is in accordance with an IEEE 802.11 protocol.

4. The method of claim 1 wherein the disrupting the transfer of data comprises transferring one or more address resolution protocol (ARP) poisoning messages to the wireless client device.

5. The method of claim 1 wherein the disrupting the transfer of data comprises transferring one or more address resolution protocol (ARP) poisoning messages to the networked device.

6. The method of claim 1 wherein the disrupting the transfer of data comprises transferring one or more transmission control protocol (TCP) reset messages to the wireless client device.

7. The method of claim 1 wherein the disrupting the transfer of data comprises transferring one or more transmission control protocol (TCP) reset messages to the networked device.

8. The method of claim 1 wherein the first wireless access point is identified via a first IEEE 802.11 MAC address and the second wireless access points is identified via a second IEEE 802.11 MAC address, the first IEEE 802.11 MAC address being different from the second IEEE 802.11 MAC address.

9. The method of claim 1 wherein the layer 2 wireless link between the wireless client device and the first wireless access point is in a connected state at each of the wireless client device and the first wireless access point prior to disrupting the transfer of data between the wireless client device and the networked device that occurs over the layer 2 wireless link between the wireless client device and the first wireless access point.

10. The method of claim 1 wherein the layer 2 wireless link between the wireless client device and the first wireless access point is in a connected state at each of the wireless client device and the first wireless access point while disrupting the transfer of data between the wireless client device and the networked device.

11. The method of claim 10 wherein the connected state at the wireless client device is a state of being associated to the first wireless access point in accordance with an IEEE 802.11 MAC protocol.

12. The method of claim 1 wherein the disrupting the transfer of data comprises preventing at least one packet from a plurality of Internet Protocol (IP) packets associated with the transfer of data from being transferred to its intended recipient.

13. A wireless communications system comprising:
a wireless device including a first wireless access point;
a wireless device including a second wireless access point;
a wireless device including a wireless client,
wherein the wireless client has a layer 2 wireless link with the first wireless access point, the layer 2 wireless link being used for transfer of data between the wireless client and a networked device via the first wireless access point, the wireless client configured for an access point hopping process,
wherein the access point hopping process being for establishing a layer 2 wireless link between the wireless client and a second wireless access point which is different from the first wireless access point to cause the transfer of data between the wireless client and the networked device to occur via the second wireless access point using the layer 2 wireless link between the wireless client and the second wireless access point when the wireless client detects disconnection in the layer 2 wireless link between the wireless client and the first wireless access point; and
a computer readable medium having stored on it one or more instructions for instructing a computer to:
detect the layer 2 wireless link between the wireless client and the first wireless access point, and
disrupt the transfer of data between the wireless client and the networked device while maintaining the layer 2 wireless link between the wireless client and the first wireless access point, the maintaining the layer 2 wireless link being for preventing the wireless client from detecting the disconnection in the layer 2 wireless link between the wireless client and the first wireless access point when the transfer of data is disrupted.

14. The system of claim 13 wherein the one or more instructions for instructing the computer to disrupt the transfer of data comprise one or more instructions for instructing the computer to transfer one or more ARP poisoning messages to the wireless client.

15. The system of claim 13 wherein the one or more instructions for instructing the computer to disrupt the transfer of data comprise one or more instructions for instructing the computer to transfer one or more ARP poisoning messages to the first wireless access point.

16. A system for disrupting data transfer that occurs over wireless communications between a first wireless device and a second wireless device, the system comprising:
a first wireless device, the first wireless device configured for communicating over a plurality of radio channels and configured for a channel hopping process;
a second wireless device, the second wireless device configured for communicating over the plurality of radio channels, wherein the first wireless device has a layer 2 wireless link with the second wireless device formed through a first radio channel from the plurality of radio channels, the layer 2 wireless link being used for transfer of data between the first and the second wireless devices; and
a computer readable medium having stored on it one or more instructions for instructing a computer to:
detect the layer 2 wireless link between the first wireless device and the second wireless device formed through the first radio channel;
detect the transfer of data over the layer 2 wireless link between the first and the second wireless devices formed through the first radio channel; and
disrupt the transfer of data while maintaining the layer 2 wireless link between the first and the second wireless devices formed through the first radio channel, the maintaining the layer 2 wireless link formed through the first radio channel being for preventing the first wireless device from detecting disconnection in the layer 2 wireless link formed through the first radio channel when the transfer of data is disrupted,
wherein the channel hopping process being for initiating another layer 2 wireless link between the first wireless device and the second wireless device through a second radio channel from the plurality of radio channels to cause the transfer of data to occur over the another layer 2 wireless link through the second radio channel when the first wireless device detects disconnection in the layer 2 wireless link between the first wireless device and the second wireless device formed through the first radio channel, the first radio channel being different from the second radio channel.

17. The system of claim 16 wherein the one or more instructions for instructing the computer to disrupt the transfer of data comprise one or more instructions to instruct the computer to transfer one or more address resolution protocol (ARP) poisoning messages to the first wireless device.

18. The system of claim 17 wherein the one or more address resolution protocol (ARP) poisoning messages are wirelessly transferred to the first wireless device.

19. The system of claim 16 wherein the one or more instructions for instructing the computer to disrupt the transfer of data comprise one or more instructions to instruct the computer to transfer one or more transmission control protocol (TCP) reset messages to the first wireless device.

20. The system of claim 19 wherein the one or more transmission control protocol (TCP) reset messages are wirelessly transferred to the first wireless device.

\* \* \* \* \*